US012659045B2

(12) United States Patent
Bamiedakis et al.

(10) Patent No.: US 12,659,045 B2
(45) Date of Patent: Jun. 16, 2026

(54) LINEARIZATION OF OPTICAL TRANSMITTERS FOR DATA COMMUNICATIONS

(71) Applicant: CAMBRIDGE ENTERPRISE LIMITED, Cambridge (GB)

(72) Inventors: Nikolaos Bamiedakis, Cambridge (GB); David George Cunningham, Cambridge (GB); Richard Vincent Penty, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 272 days.

(21) Appl. No.: 18/261,999

(22) PCT Filed: Jan. 25, 2022

(86) PCT No.: PCT/EP2022/051642
§ 371 (c)(1),
(2) Date: Jul. 18, 2023

(87) PCT Pub. No.: WO2022/161952
PCT Pub. Date: Aug. 4, 2022

(65) Prior Publication Data
US 2024/0137129 A1     Apr. 25, 2024

(30) Foreign Application Priority Data

Jan. 26, 2021     (GB) ..................................... 2101011

(51) Int. Cl.
*H04B 10/58* (2013.01)
*H04B 10/50* (2013.01)
*H04B 10/516* (2013.01)

(52) U.S. Cl.
CPC ........... *H04B 10/58* (2013.01); *H04B 10/504* (2013.01); *H04B 10/516* (2013.01)

(58) Field of Classification Search
None
See application file for complete search history.

(56) References Cited

U.S. PATENT DOCUMENTS 7,558,479 B1* 7/2009 Robinson ........... H04B 10/2543
398/16
7,805,082 B1 9/2010 Whiteaway
(Continued)

FOREIGN PATENT DOCUMENTS

EP     0524758 A2    1/1993
JP     H01146439 A    6/1989

OTHER PUBLICATIONS

Written Opinion & International Search Report (WOISR) for corresponding PCT/EP2022/051642.
(Continued)

*Primary Examiner* — Darren E Wolf
(74) *Attorney, Agent, or Firm* — Tarolli, Sundheim, Covell & Tummino LLP

(57) ABSTRACT
Techniques for driving a directly modulated laser whilst correcting non-linearities an optical output waveform, based on generating a modulating current waveform that approximates an ideal modulating current that produces a linear optical output waveform. The techniques enable useful, practical approximations to the ideal modulating current to be determined.

18 Claims, 18 Drawing Sheets

(56) References Cited

U.S. PATENT DOCUMENTS

| | | | |
|---|---|---|---|
| 2004/0197103 A1 | 10/2004 | Roberts et al. | |
| 2007/0264027 A1 | 11/2007 | Zhou | |
| 2008/0181619 A1 | 7/2008 | Heismann et al. | |
| 2009/0196630 A1* | 8/2009 | Ishaug | H04B 10/697 |
| | | | 398/193 |
| 2010/0098436 A1* | 4/2010 | Mahgerefteh | H04B 10/504 |
| | | | 398/192 |
| 2010/0315018 A1 | 12/2010 | Then et al. | |
| 2011/0095819 A1* | 4/2011 | Velazquez | H03F 1/3247 |
| | | | 330/149 |
| 2014/0292406 A1* | 10/2014 | Dechen | H03F 1/3247 |
| | | | 330/149 |

OTHER PUBLICATIONS

Karar, et al.: "Transmission Over 608 km of Standard Single-Mode Fiber Using a 10.709-GB/s Chirp Managed Laser and Electronic Dispersion Precompensation"; IEEE Photonics Technology Letters, IEEE, USA, vol. 24, No. 9, May 1, 2012 (May 1, 2012), pp. 760-762, XP011441064, ISSN: 1041-1135, DOI:10.1109/LPT.2012.2187781 cited in the application Part II; figures 1,2.

Hecht Urs et al: "Non-Linear PAM-4 VCSEL Equalization and 22 nm SOI CMOS DAC for 112 Gbit/s Data Transmission", 2019 12th German Microwave Conference (GEMIC), IMA—Institut Fur Mikrowellenund Antennentechnik E.V, Mar. 25, 2019 (Mar. 25, 2019), pp. 115-118, XP033541374, DOI: 10.23919/GEMIC.2019.8698167 [retrieved on Apr. 23, 2019] cited in the application the whole document.

Karar: "Digital Signal Processing for Directly Modulated Lasers in Optical Fiber Communication"; A thesis submitted to the Department of Electrical and Computer Engineering in conformity with the requirements for the degree of Doctor of Philosophy; Queen's University; Jan. 2013 (submitted in 4 parts due to size of document).

Karar, et al.-2: "Electronic dispersion pre-compensation for 10.709-Gb/s using a look-up table and a directly modulated laser"; Optical Society of America; OCIS Codes: (060.2330) Fiber optics communications; (140.5960) Semiconductor laser; (C) 2011 OSA Dec. 12, 2011 / vol. 19, No. 26 / Optics Express B81.

Yazaki, et al.: "25-Gbps×4 optical transmitter with adjustable asymmetric pre-emphasis in 65-nm CMOS"; Authorized licensed use limited to: Cambridge Univ. Downloaded on Jul. 17, 2023 at 14:37:56 UTC from IEEE Xplore. Restrictions apply.

* cited by examiner (a)

(b)

(c)

(d)

(e)

(f)

1

LINEARIZATION OF OPTICAL TRANSMITTERS FOR DATA COMMUNICATIONS

The present invention is a U.S. National Stage under 35 USC 371 patent application, claiming priority to Serial No. PCT/EP2022/051642, filed on 25 Jan. 2022; which claims priority from GB 2101011.1, filed 26 Jan. 2021, the entirety of both of which are incorporated herein by reference.

FIELD

This specification relates to systems for driving lasers for optical data communications.

BACKGROUND

There is a continuing need for faster optical data communications in particular over fibre such, as multimode fibre. One approach to this involves direct modulation of a laser light source for the fibre optic link but a problem with directly modulated lasers is their intrinsic high frequency dynamic non-linearity. This can result in skew in the optical eye diagram, thickening of the optical levels, and increased jitter. The effects are particularly pronounced with modulation formats which send multiple bits per symbol, such as PAM-4, and the non-linearities cannot be mitigated by linear equalization.

Background prior art can be found in US2010/0315018, which derives a feedback signal from an electrical operating signal of a light-emitting transistor, distorts this, and combines it with an input signal; in US2004/0197103, which describes a technique for compensating non-linearities imparted by an optical link (rather than in the laser); and in US2007/0264027, which describes a dispersion compensation circuit. Karar et al. "Electronic dispersion precompensation for 10.709-Gb/s using a look-up table and a directly modulated laser," Opt. Express, vol. 19, no. 26, B81-B89, 2011, describes an approach to approximating a laser drive current using a lookup table; and in Karar et al. "Transmission Over 608 km of Standard Single-Mode Fiber Using a 10.709-Gb/s Chirp Managed Laser and Electronic Dispersion Precompensation" IEEE photonics Technology Letters, vol. 24, no. 9, pp. 760-762. Further background prior art can be found in US2008/0181619; Yazaki et al., "25-Gbpsx×4 optical transmitter with adjustable asymmetric pre-emphasis in 65-nm CMOS," 2014 IEEE International Symposium on Circuits and Systems (ISCAS), Melbourne VIC, 2014, pp. 2692-2695; U. Hecht et al., "Non-Linear PAM-4 VCSEL Equalization and 22 nm SOI CMOS DAC for 112 Gbit/s Data Transmission," 2019 12th German Microwave Conference (GeMiC), Stuttgart, Germany, 2019 pp. 115-118; US2010/0098436; US2008/0181619; EP0524758A; and JPH01146439A.

SUMMARY

This specification generally relates to methods and systems for driving a directly modulated laser whilst correcting non-linearities in the optical output waveform of the laser. The laser may be any type of directly modulated laser but in implementations is a semiconductor laser, for example a VCSEL (vertical cavity surface emitting laser).

Implementations of the method are based on generating a modulating current waveform that approximates an ideal modulating current that produces a linear optical output waveform and that can be back-calculated from the laser rate equations. An exact back-calculation is difficult because it involves terms which may not be known or are difficult to determine, and an approximation of the ideal modulating current is described which sufficiently corrects the non-linearities and which can be implemented practically.

Thus, in one aspect there is described a method of driving a directly modulated, e.g. amplitude modulated whilst correcting non-linearities in an optical output waveform of the laser.

The method may comprise obtaining, e.g. from an electrical input, encoded data defining a target output waveform of the laser for transmission of the encoded data. The target output waveform defines a target (linear) optical output of the laser over time. The optical output may be e.g. an optical power or a number of photons output.

The method may further comprise determining a target drive current waveform for the laser to reproduce the target output waveform, and driving the laser using the target drive current waveform.

In implementations the target drive current waveform comprises a constant drive current term ($I_D$), and a second drive current term ($I_C$) having a value dependent upon, e.g. proportional to, the target optical output. The target drive current waveform may comprise a first estimated drive current correction term ($\widetilde{i_B}$) having a value dependent upon, e.g. proportional to, a first derivative rate of change of the target optical output with time. The target drive current waveform may comprise a second estimated drive current correction term ($\widetilde{i_A}$) having a value dependent upon, e.g. proportional to, a second derivative rate of change of the target optical output with time.

In some implementations the first drive current correction term, $\widetilde{i_B}$, has a value proportional to the first derivative rate of change of the target optical output with time. In some implementations the second drive current correction term, $\widetilde{i_A}$, has a value proportional to the second derivative rate of change of the target optical output with time.

In some implementations the target drive current waveform is defined by $$a\frac{d\,\widetilde{i_B}(t)}{dt} + b\frac{d\,\widetilde{i_C}(t)}{dt} + I_C(t) + I_D, \text{ where } \widetilde{i_B}(t) = \frac{d\,\widetilde{i_C}(t)}{dt}$$

and where a and b are constants. The values of a and b may be determined, e.g. calculated, from parameters of the laser and from an operating bias point of the laser. The constant drive current term, $I_D$, may represent a threshold current of the laser. However, the laser may be operated with a bias current, which may be defined by a constant part of the second drive current term, $I_C$, and/or by $I_D$.

As described later, whilst the target drive current waveform may be defined in this way it is not necessarily obtained by performing these mathematical operations—there are many ways of obtaining the target drive current waveform using analog and/or digital circuits.

Implementations of the method can linearize the behaviour of a directly modulated laser. Once this is done, even with a partially closed eye an adaptive linear equalizer at a receiver can more fully open the eye. Implementations of the method can reduce skew, level thickness and jitter of an optical laser-based transmitter.

A further advantage of implementations of the method is that the target drive current waveform is practical to generate with analog circuits, digital circuits or with digital signal processing (DSP) and digital to analog converters (DACs), and has sufficiently large tolerances to make the approach suitable for real-world use. For example, the described methods are not particularly sensitive to values of the scaling parameters a and b.

A more accurate approximation to the ideal target modulating current may be obtained by modifying a timing of the second estimated drive current correction term, $\tilde{I}_A$. In particular for a positive transition (in which the optical output increases) this may involve advancing a timing of the second estimated drive current correction term with respect to the positive transition; and for a negative transition (in which the optical output decreases) delaying a timing of the second estimated drive current correction term with respect to the negative transition. Generally, the positive and negative transitions correspond to positive and negative transitions in a waveform of the encoded data.

In some approaches implementing the timing advance may involve delaying the second drive current term, $I_C$, or more generally, the encoded data. In implementations modifying a timing of the second estimated drive current correction term may comprise determining a timing-adjusted version of the encoded data waveform, e.g. a version with DCD (duty-cycle distortion) to stretch the duration of periods with a relatively higher drive current. The modified second estimated drive current correction term $$(I_A^{st})$$

may then be determined from the timing-adjusted waveform. The timing adjusted waveform may be formed, for example, by passing the encoded data waveform through a FIR (finite impulse response) filter with two taps followed by a limiting or thresholding circuit. The two taps of the FIR being configured with one to either side of a delay stage which implements a delay equal to the timing advance (which here is the same as the timing delay).

In some approaches a more accurate approximation to the target output waveform is facilitated by adjusting values of the scaling parameters a and b. More particularly, these may be adjusted dependent upon a timing misalignment between the modified second drive current term $$(I_A^{st})$$

and the second estimated drive current correction term. For example where the modified second estimated drive current correction term implements equal timing advance and timing delay for positive and negative transitions respectively, so that this term is time-stretched symmetrically, the timing misalignment may represent a degree of asymmetry, or lack of equality, between the timing advance and the timing delay.

Typically, the method is used for sending data over a communications channel such as a fibre optic communications channel. Typically, data to be communicated is encoded using a modulation scheme such as NRZ (non-return to zero) or PAM-M (pulse amplitude modulation-M), to provide the encoded data. The encoded data typically has transitions between discrete levels e.g. discrete amplitude levels, and is represented by a waveform, referred to here as an encoded data waveform. For example, in NRZ (also referred to as PAM-2) the encoded data waveform has two levels, and in PAM-M the encoded data waveform has M levels (amplitudes). The encoded data (waveform) defines corresponding symbols which are sent over the communications channel. Thus, in implementations when the target drive current waveform modulates the laser, the symbols are reproduced by the target (optical) output waveform.

Where the encoded data is PAM-M modulated, and e.g. M>2, a waveform of the encoded data has step transitions between discrete PAM-M levels of the optical output of the laser. Then the first estimated drive current correction term and the second estimated drive current correction term are each dependent upon, and may be scaled by, a size (and direction) of the step transitions between the discrete PAM-M levels. Thus in some implementations the first estimated drive current correction term and the second estimated drive current correction term are determined for a transition between a single pair of discrete PAM-M levels, and scaled. In some other implementations the first estimated drive current correction term and the second estimated drive current correction term are determined separately for multiple different pairs of transitions between discrete PAM-M levels.

Thus, in some implementations the same first estimated drive current correction term and second estimated drive current correction term may be used for each of the step transitions between the discrete PAM-M levels, scaled by the size of the step transition (which takes values between 1 and M−1). Here, for example, M>2. For negative (falling) transitions an additional multiplier of −1 may be applied.

Some implementations of the method use analog signal processing to determine the target drive current waveform. Thus, the second drive current term ($I_C$) may be determined from the waveform of the encoded data, e.g. by convolving with an impulse response such as Gaussian impulse response or the impulse response of a raised cosine filter. Then this may be differentiated and scaled to determine the first estimated drive current correction term and then this or the first estimated drive current correction term differentiated again to determine the second estimated drive current correction term. These terms may then be summed (together with a bias term) to determine the target drive current waveform. Optionally the second estimated drive current correction term may be modified as described above.

Some implementations of the method partly use digital signal processing to determine the target drive current waveform. For example, when a waveform of the encoded data has step transitions between discrete levels of optical output of the laser, i.e. the waveform is amplitude modulated, again the second drive current term ($I_C$) may be determined from the waveform of the encoded data, but the first estimated drive current correction term and the second estimated drive current correction term may be determined digitally.

More specifically the first estimated drive current correction term may be determined from a (3-level) di-code representation of transitions of the waveform of the encoded data. As defined herein a di-code representation has a pulse for each transition, with a polarity defined by the direction of the transition.

The second estimated drive current correction term may be determined from a di-code, bi-phase representation of transitions of the waveform of the encoded data. As defined herein a (3-level) di-code bi-phase representation has a bi-phase pulse for each transition, with a polarity defined by the direction of the transition. The di-code, bi-phase representation may be derived from the timing-adjusted version of the encoded data waveform previously described. Thus, the bi-phase pulses may be time-aligned with transitions of the timing-adjusted version of the encoded data waveform and have a timing offset from transitions of the target output waveform.

The first and second estimated drive current correction terms may be combined with the second drive current term, e.g. after scaling as described above. The combined drive terms may optionally be filtered to provide a desired impulse response i.e. to set the rise and fall times of the modulation current; or such filtering may be performed prior to combining.

In some implementations the scaling and combining may be implemented within a digital serializer-deserializer (SerDes) circuit. In implementations the SerDes circuit includes a linear equalizer which may be used to equalize an electrical channel to the physical laser.

Some implementations of the method use a feed forward equalizer (FFE) to determine the target drive current waveform. Typically, for this type of implementation, the waveform of the encoded data would consist of impulses each having a duration much less than the symbol period with amplitude proportional to the amplitude of the PAM-M symbol. Thus, determining the target drive current waveform for the laser may comprise passing the waveform of the encoded data through a feed forward equalizer with taps having a (time) spacing of half a symbol period of the encoded data (and hence also of the target optical output waveform). Thus, the feed forward equalizer may have an output defined by the sum of a set of signals each comprising a version of the input weighted by a respective tap coefficient, where successive versions of the input are delayed by half a symbol period.

Implementations of the method need not rely on feedback e.g. from an output of the laser. However with feedback, either from the transmitter or from the receive end of the optical link, implementations may use adaptive methods to find near optimum values of parameters of the method, e.g.: the mean squared error (MSE), with respect to the desired target optical waveform could be minimised as a function of the relevant parameters for the method.

Thus the method may include obtaining feedback data characterizing an optical waveform of the laser e.g. at the transmitter or at a receiver of the encoded data, and modifying the target drive current waveform responsive to the feedback data to optimise the optical waveform of the laser. Modifying the target drive current waveform may comprise modifying one or both of the first estimated drive current correction term and the second estimated drive current correction term, e.g. by modifying one or both of the scaling parameters a and b, the timing advance/delay (dt), or a timing offset ($t_{off}$) as described later. Optimise the optical waveform of the laser may comprise minimising a mean squared error of the optical waveform e.g. relative to the target output waveform of the laser, or optimising an eye diagram of the optical waveform e.g. to maximise an eye-opening area.

In another aspect there is described a driver for a laser of an optical data communications system. The driver has an input to receive encoded data defining a target output waveform of the laser. The target output waveform defines a target optical output of the laser over time. The driver also has an output to provide a current drive for the laser. The driver further comprises a system configured to determine a target drive current waveform for the current drive to reproduce the target output waveform. In implementations the target drive current waveform comprises one or more of i) a constant drive current term ($I_D$) and ii) a second drive current term ($I_C$) having a value dependent upon the target optical output, iii) a first estimated drive current correction term ($\widetilde{I_B}$) having a value dependent upon a first derivative rate of change of the target optical output with time, and iv) a second estimated drive current correction term ($\widetilde{I_A}$) having a value dependent upon a second derivative rate of change of the target optical output with time.

The target drive current waveform may be defined by $$a\frac{d\widetilde{I_B}(t)}{dt} + b\frac{d\widetilde{I_A}(t)}{dt} + I_C(t) + I_D, \text{ where } \widetilde{I_B}(t) = \frac{d\widetilde{I_A}(t)}{dt}$$

and where a and b are constants.

In implementations a waveform of the encoded data has transitions between at least two discrete levels of optical output of the laser, a higher level and a lower level. The system may be configured to modify the second estimated drive current correction term ($\widetilde{I_A}$) to advance a timing of portions of the second estimated drive current correction term corresponding to transitions of the waveform of the encoded data from a lower level to a higher level of optical output. The system may be further configured to delay, i.e. retard, a timing of portions of the second estimated drive current correction term corresponding to transitions of the waveform of the encoded data from a higher level to a lower level of optical output. A sub-system may be included to use feedback to optimise the optical waveform of the laser.

DRAWINGS

These and other aspects of the invention will now be further described by way of example only, with reference to the accompanying figures, in which.

FIGS. 4a-d further illustrate robustness of the example approximated laser drive current waveform to parameter modifications, and effects of parameter modifications.

Figure 5:
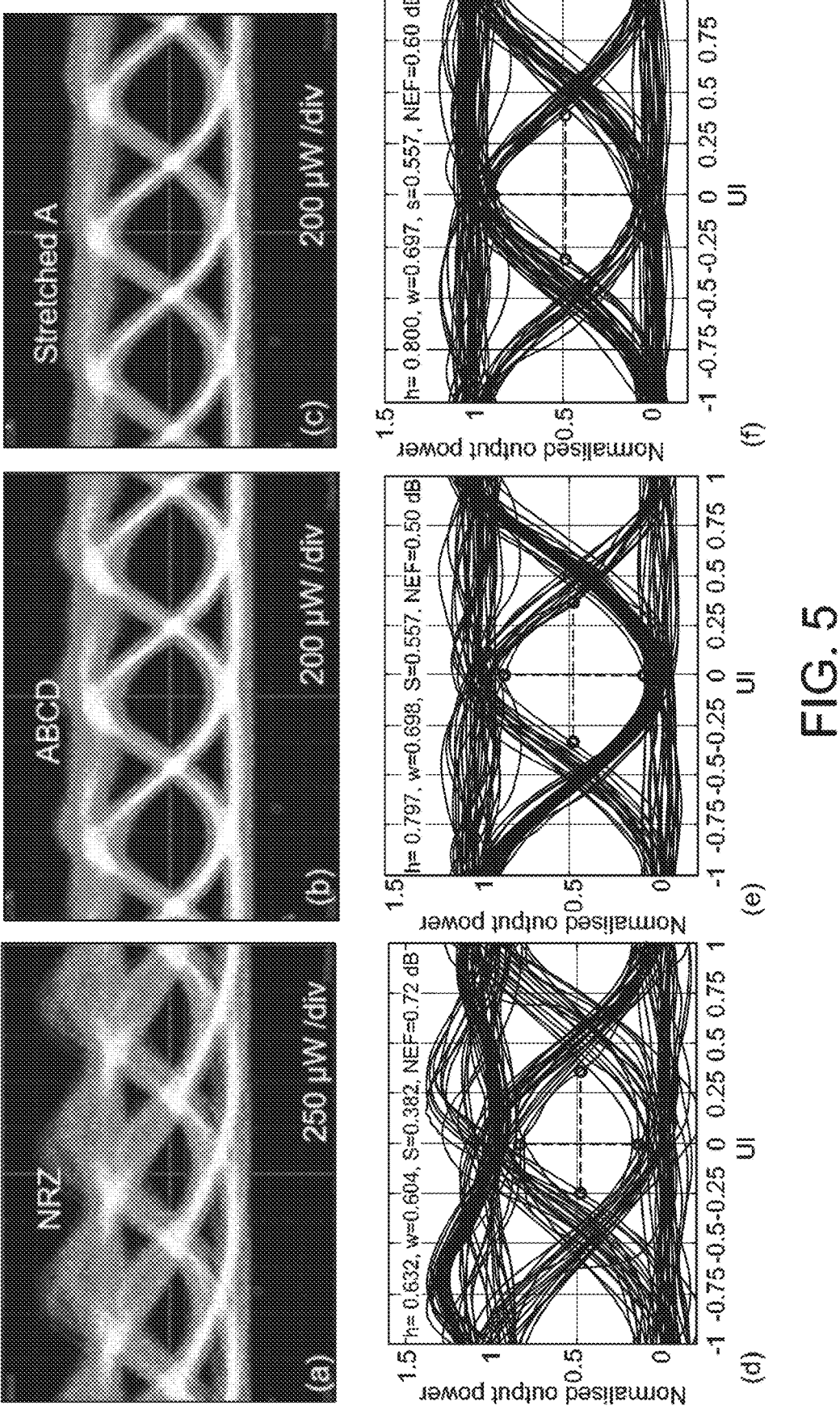

FIG. 5 shows experimentally measured NRZ eye diagrams.

Figure 6A:
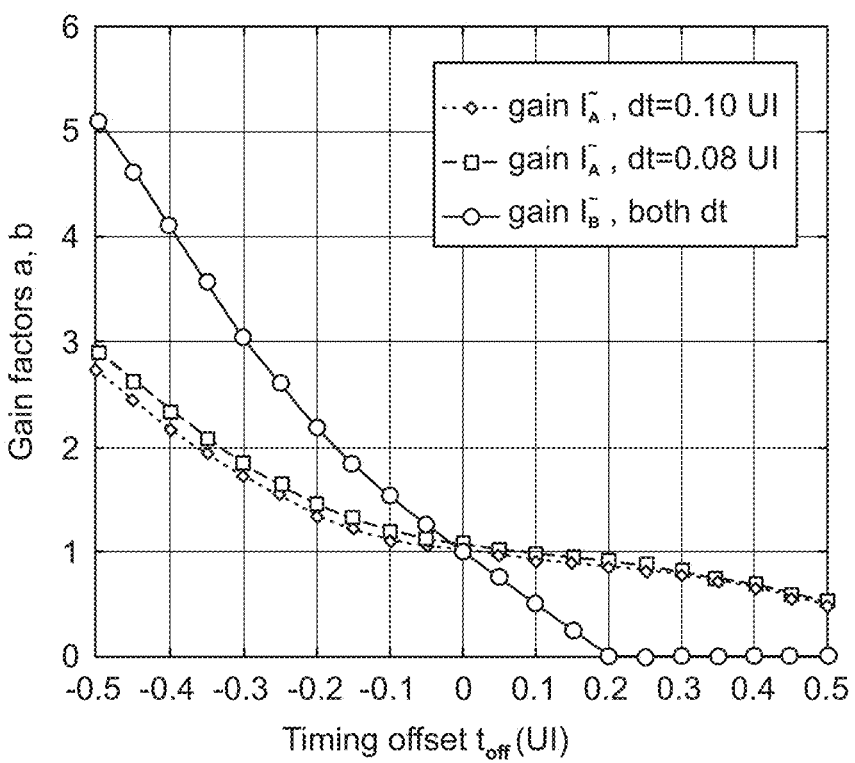

FIGS. 6a,b show gain values for scaling factors a and b as a function of $t_{off}$ and illustrate robustness of the adaptive gain scheme.

FIGS. 7a-h show measured PAM4 eye diagrams.

Figure 8:
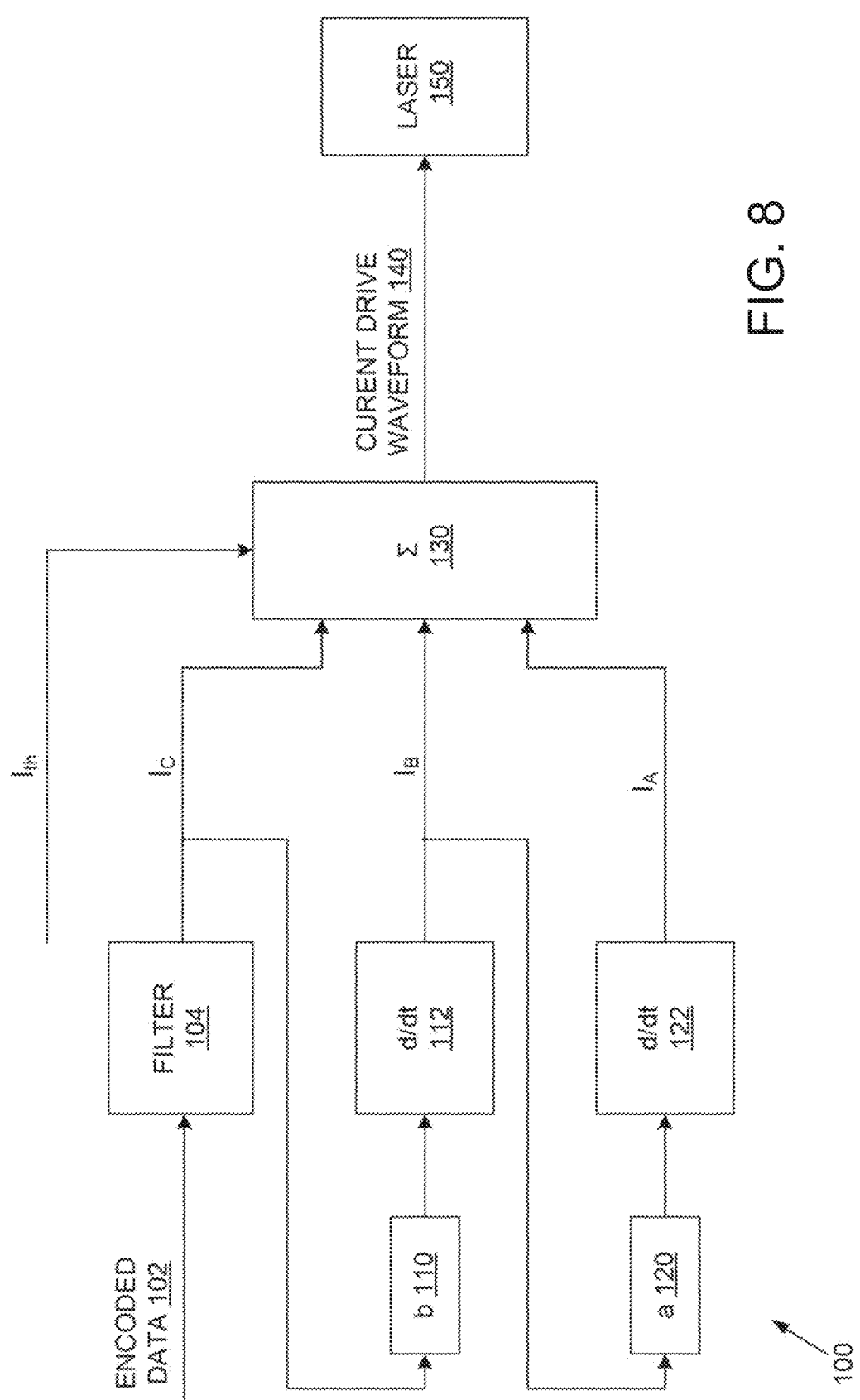

FIG. 8 shows a first example of a laser driver.

FIGS. 9a-d show a second example of a laser driver and associated waveforms.

Figures 10A, 10B, 10C:
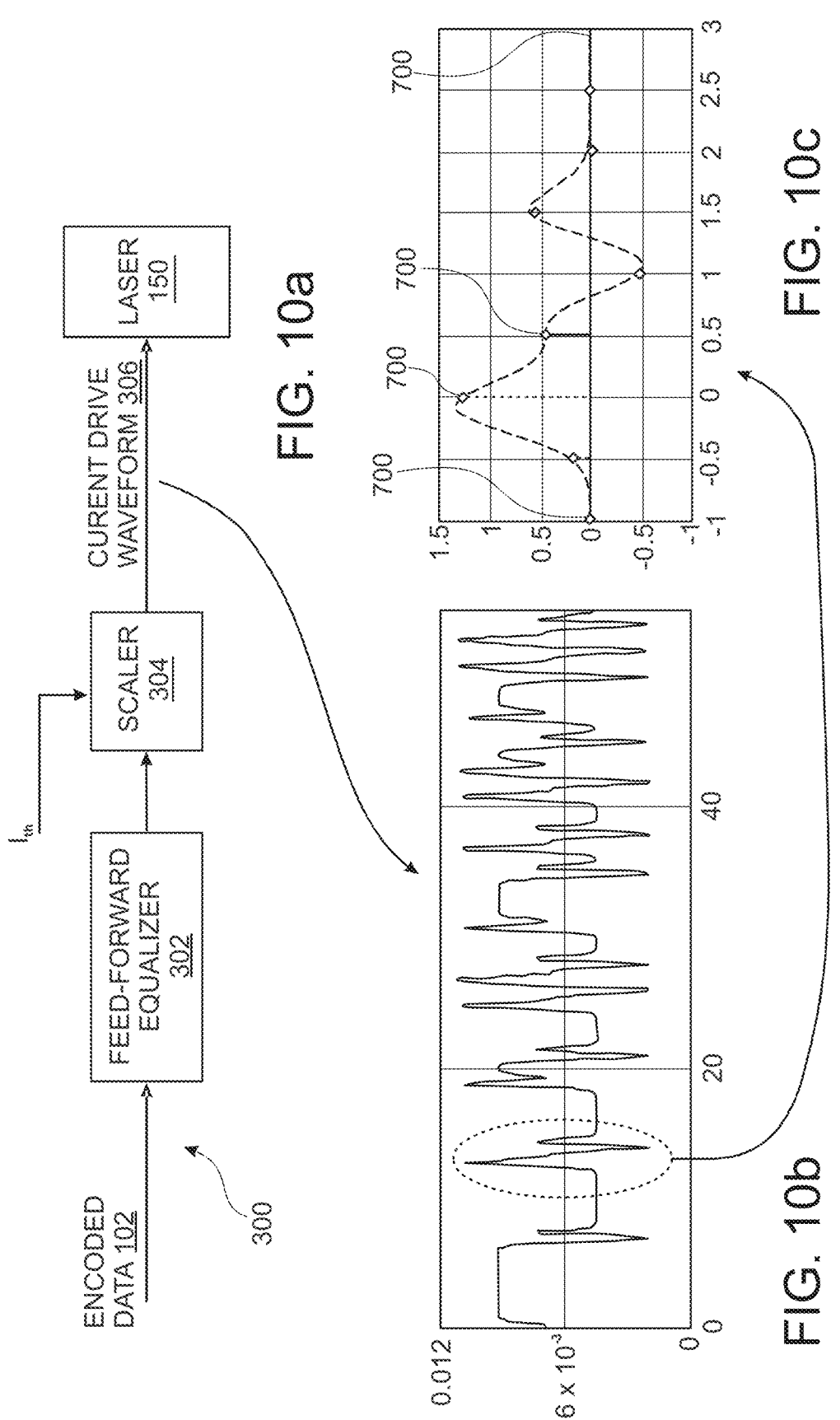

FIGS. 10a-c show a third example of a laser driver and associated waveforms.

Like elements are indicated by like reference numerals.

DESCRIPTION

A technique is described for linearization of the laser optical output waveform of an optical link. The optical link may be a multimode fibre (MMF) link and the optical output waveform may be generated by a directly modulated semiconductor laser such as a VCSEL. The optical output waveform may be amplitude modulated e.g. using NRZ or PAM-M.

The optical link may transmit data at 25 Gb/s or greater per optical lane. However, a problem with directly modulated semiconductor lasers is their intrinsic high-frequency dynamic non-linearity. However, if the laser output could be made linear, even with a partially closed eye, then an adaptive linear equalizer at the receiver could more fully open the received eye. The equalised eye would have much less skew, level thickness, and jitter when compared with a non-linearized optical transmitter.

The described technique is based on generating a modulating i.e. drive current waveform that approximates the ideal modulating current that produces a linear optical output waveform. The approximation sufficiently corrects the non-linearity and has large enough tolerances to be useful for real-world implementation.

The ideal modulating current can be back-calculated from the laser rate equations. In particular, the modulation current $I_{bc}(t)$ to produce a desired photon density $N_p(t)$ in the laser cavity, and hence the target optical output waveform $P(t)=\eta N_p(t)$, where $\eta$ is the total conversion efficiency of the laser, can be expressed as:

$$I_{bc}(t) = I_A(t) + I_B(t) + I_C(t) + I_D$$

Here the constant term $I_D$ is equal to the threshold current $I_{th}$, and the linear term $I_C(t)$ is proportional to the photon density:

$$I_C(t) = \frac{qV}{\Gamma} N_p(t) \cdot \left(1 + \frac{\epsilon}{g_0 \tau_e}\right)$$

where q is the charge of an electron, V is the volume of the active region, $\Gamma$ is the optical confinement factor, $\epsilon$ is the gain compression factor, $g_0$, is the gain slope coefficient, and $\tau_e$ is the carrier lifetime.

The first drive current correction term $I_B$ is (practically) proportional to the first order time-derivative of the photon density, $$N_p' = \frac{dN_p(t)}{dt}: I_B(t) = \frac{qV}{\Gamma} N_p' \cdot \left(1 + \frac{\epsilon}{g_0 \tau_p} + \frac{1 + \epsilon N_p}{g_0 \tau_p N_p}\right)$$

where $\tau_p$ is the photon lifetime.

The second drive current correction term $I_A$ includes higher order derivatives and non-linear terms:

$$I_A(t) = \frac{qV}{\Gamma g_0} \cdot \left(\frac{N_p''}{N_p} - \left(\frac{N_p'}{N_p}\right)^2 + \epsilon N_p''\right) \text{ where } N_p'' = \frac{d^2 N_p(t)}{dt^2}$$

is the second order time-derivative of the photon density. The dynamic non-linearity of the laser rate equations is described by $I_A$ and $I_B$ in the above expressions. If the ideal $I_{bc}(t)$ could be generated the optical output waveform would not include any non-linear distortion and could therefore be equalized by conventional methods. However, generation of $I_A$, in particular, is difficult because of the $$\frac{1}{N_p}$$

terms. However, for transitions of the optical waveform between two levels of optical power, the inventors have determined that the expressions for both $I_A$ and $I_B$ can be simplified in a way which works well practice by omitting higher order terms and approximating $$\frac{1}{N_p} \text{ by } \frac{1}{\overline{N_p}}$$

where $\overline{N_p}$ is the average photon density due to the two levels of optical power. $\overline{N_p}$ can be determined from $P(t)=\eta N_p(t)$; the total conversion efficiency of the laser, $\eta$, may be known, or calculated e.g. from $$\eta = \frac{V \eta_d h\nu}{2\Gamma\tau_p}$$

where h is manic's constant, $\nu$ is the light frequency, and $\eta_d$ is the differential quantum efficiency of the laser.

Thus, a first estimated drive current correction term $\tilde{I}_B$, which is a good approximation to $I_B$ is given by:

$$\tilde{I}_B = \frac{qV}{\Gamma} N_p' \cdot \left(1 + \frac{\epsilon}{g_0}\left(\frac{1}{\tau_p} + \frac{1}{\tau_e}\right)\right)$$

A second estimated drive current correction term $\tilde{I}_A$, which is a good approximation to $I_A$ is given by:

$$\tilde{I}_A = \frac{qV}{\Gamma g_0} \cdot \left(\frac{1}{\overline{N_p}} + \epsilon\right) N_p''$$

It can be seen that $\tilde{I}_B$ and $\tilde{I}_A$ are proportional to, respectively, $$\frac{dP(t)}{dt}$$

and $$\frac{d^2 P(t)}{dt^2};$$

and $I_C$ proportional to $P(t)$. Thus, an approximation $\widetilde{I_{bc}}(t)$ to the ideal, back-calculated laser modulation current $I_{bc}(t)$ can be approximated as $$\widetilde{I_{bc}}(t) = a\frac{d\widetilde{I_B}(t)}{dt} + b\frac{d\widetilde{I_C}(t)}{dt} + I_C(t) + I_{th} \tag{1}$$

where a and b are scaling (gain) parameters such that, $$a\frac{d\widetilde{I_B}(t)}{dt} = \tilde{I}_A \text{ and } b\frac{d\widetilde{I_C}(t)}{dt} = \tilde{I}_B.$$

In implementations a and b are constants that depend on the laser parameters and operating bias point. For example, values of a and b can be determined from the approximate expressions below:

$$a \approx \left( \frac{1}{N_p} + \epsilon \right) \frac{g_0 \tau_p \tau_e}{(\epsilon + g_0 \tau_e)(\epsilon + g_0 \tau_p)}$$

$$b \approx \tau_p + \frac{\epsilon}{g_0}$$

Equation (1) shows that in order to reproduce the target optical output waveform P(t) and avoid non-linear distortions it suffices to derive the linear component $I_C$(t), proportional to P(t), and its first and second derivatives with respect to time, and to estimate the scaling factors a and b, in order to determine the total approximate back-calculated laser modulation current $\widetilde{I_{bc}}$ (t).

Some example parameter values for a VCSEL are given below, merely to indicate the general magnitudes of the parameters.

| Mode confinement factor | Γ | 0.18 |
|---|---|---|
| Spontaneous emission factor | β | 0.001 |
| Active region volume | V | 3.8E−18 m³ |
| Electron lifetime | $\tau_e$ | 4.0E−09 s |
| Photon lifetime | $\tau_p$ | 5.0E−12 s |
| Gain slope constant | $g_0$ | 1.2E−11 m³s⁻¹ |
| Gain compression factor | ε | 4.125E−23 m³ |

In practice only approximate values of a and b are needed as these have large tolerances, the values may be calculated i.e. known by design, determined experimentally or found by automatic adaptive search methods. Further, the approximation of equation (1) is tolerant to misalignment of the three components $\widetilde{I_A}$, $\widetilde{I_B}$ and $I_C$ in time. Various analog and digital techniques may be used to construct $\widetilde{I_{bc}}$ (t), as described later.

In practice the accuracy of the $\widetilde{I_A}$ A component may be improved if this is shifted in time with respect to the rising and falling edges of the linear component $I_C$. In particular accuracy is improved if a timing advance is introduced for positive (rising) transitions e.g. 0→1 and if a symmetric timing delay is introduced for falling (negative) transitions e.g. 1→0. Such a modified second estimated drive current correction term may be referred to as a "Stretched A" or time-shifted correction term, $$I_A^{st}$$

This waveform can be generated, for example, from a version of $I_C$ with duty cycle distortion (DCD) which stretches the duration of periods of high current level and shrinks the duration of periods of relatively lower current level.

Figure 1:
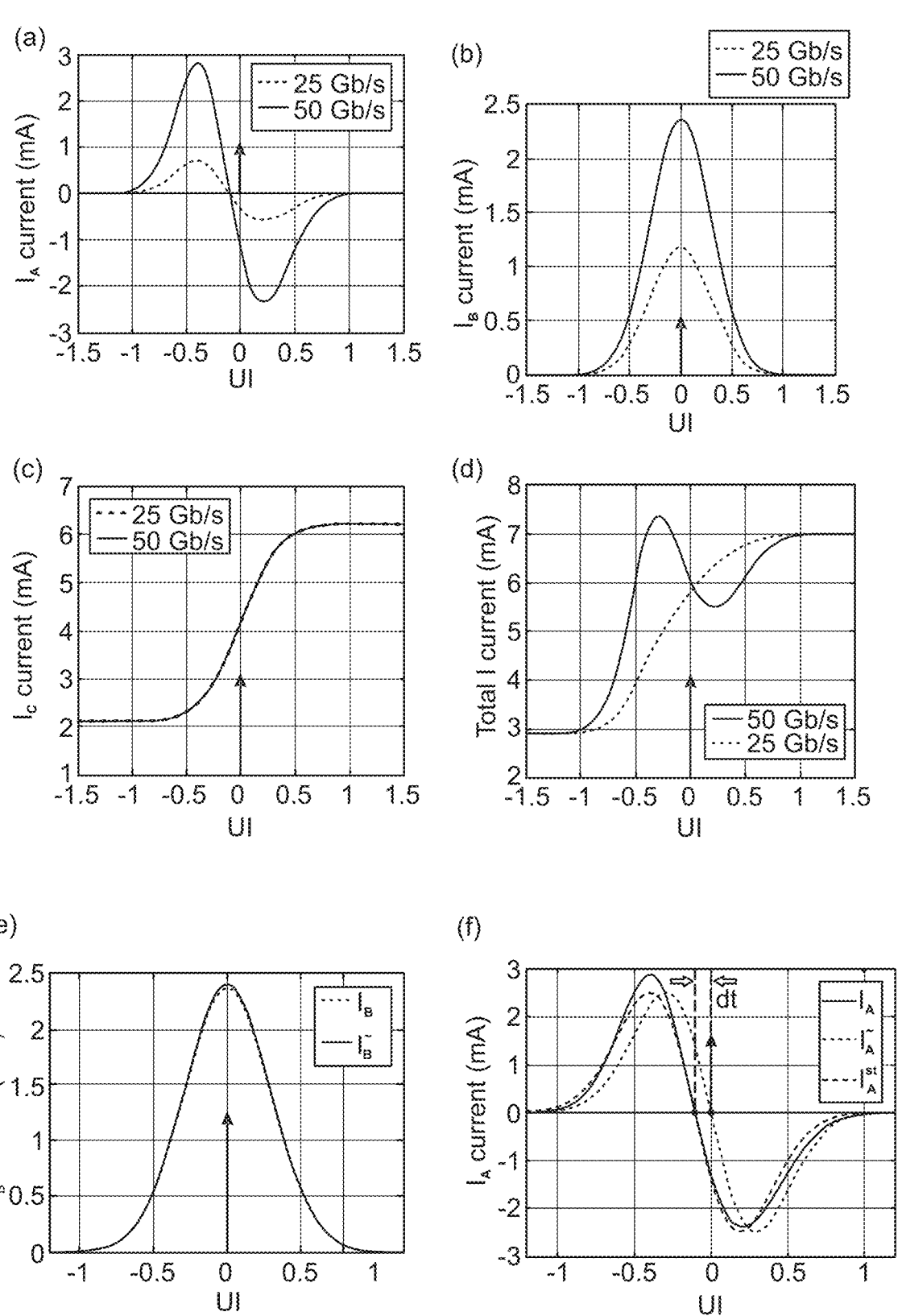
FIG. 1 shows example components of an ideal and of an approximated laser drive current waveform.

FIG. 1 illustrates, for NRZ encoded data, components of an example ideal drive current waveform $I_{bc}$(t) and components of $\widetilde{I_{bc}}$ (t) as approximated by equation (1). This example ideal waveform is based on the convolution of a Gaussian impulse with a step transition. The Gaussian impulse is defined by $$h(t) = \frac{1}{\sigma \sqrt{2\pi}} \exp\left( -\frac{t^2}{2\sigma^2} \right)$$

where σ is the standard deviation of the response and the 10% to 90% step response time $T_c$=2.563 σ. For PAM-4 (not shown) the Gaussian impulse may be convolved with a PAM-4 transition.

FIGS. 1a-1d show, respectively, the ideal $I_A$, $I_B$, and $I_C$ components and the ideal total current $I_{bc}$(t) for a VCSEL with the above parameters with modulation at 25 Gb/s and 50 Gb/s. The y-axis shows current in milliamperes, the x-axis shows unit intervals (UI) i.e. symbol durations, and the vertical arrow indicates the time of the transition. In FIG. 1c the initial photon density (proportional to $I_C$ in the figure) is greater than zero (as might occur e.g. for NRZ modulation where the zero level is not equal to the zero light level or between some levels in PAM-4 modulation). FIGS. 1a, 1b and 1d show that the corrections are larger at higher data rates, indicating larger laser non-linearity.

FIG. 1e compares the ideal $I_B$ and approximated $\widetilde{I_B}$ first estimated drive current correction term ($\widetilde{I_B}$) for a positive step in $I_C$; these are practically identical.

FIG. 1f compares the ideal $I_A$ and approximated $\widetilde{I_A}$ second estimated drive current correction term ($\widetilde{I_A}$) for a positive step in $I_C$. The $\widetilde{I_A}$ A component has a similar shape to the ideal but there is a small timing mismatch due to omission of higher order correction terms. FIG. 1f shows a time-shifted version of the second estimated drive current correction term $$I_A^{st} -$$

when shifted by dt this better approximates the ideal $I_A$. The time-shifted correction term $$I_A^{st}$$

may be defined as having a relative amplitude of γ relative to $\widetilde{I_A}$ so that $$I_A^{st}(t) = \gamma \widetilde{I_A}(t + dt).$$

A quality of an eye diagram of the optical output waveform of the laser can be characterized e.g. by the area of the open eye (larger is better).

Figure 2:
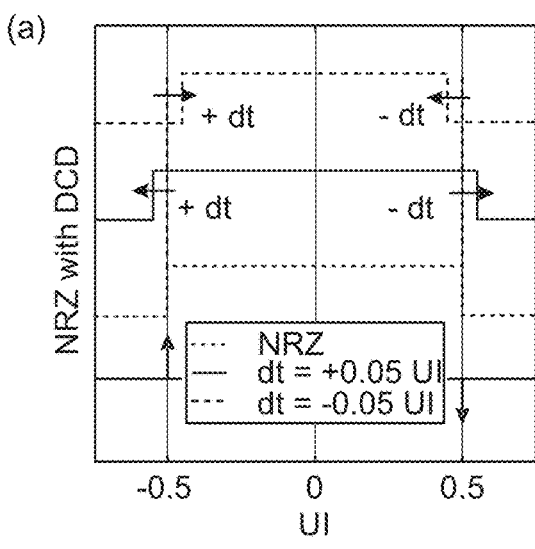
FIG. 2 illustrates modifications to the example approximated laser drive current waveform and their effect.
Figure 2:
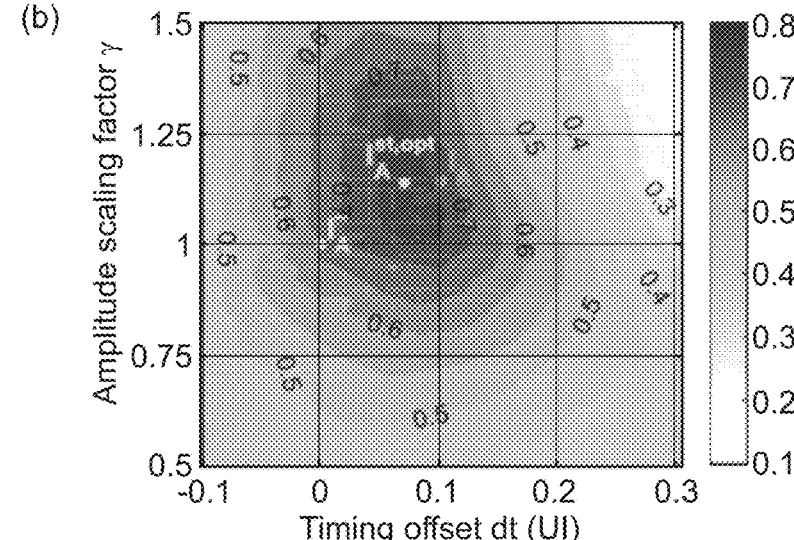
Figure 2:
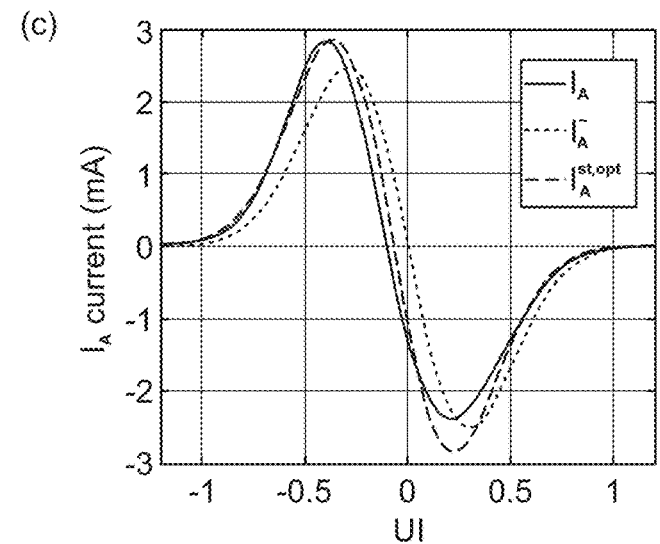
Figure 2:
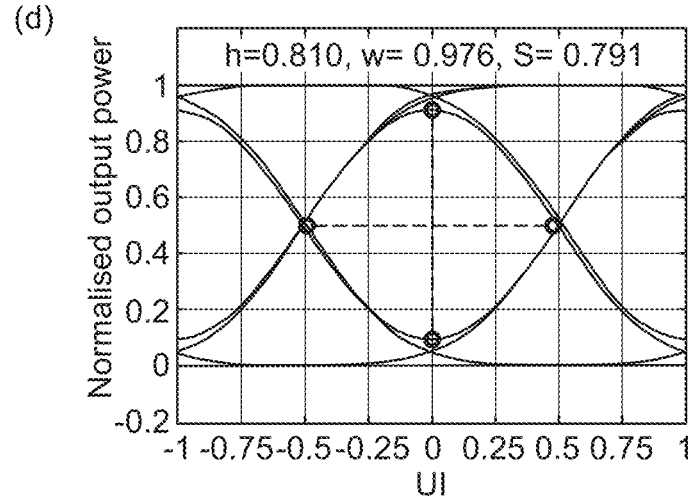
Figure 2:
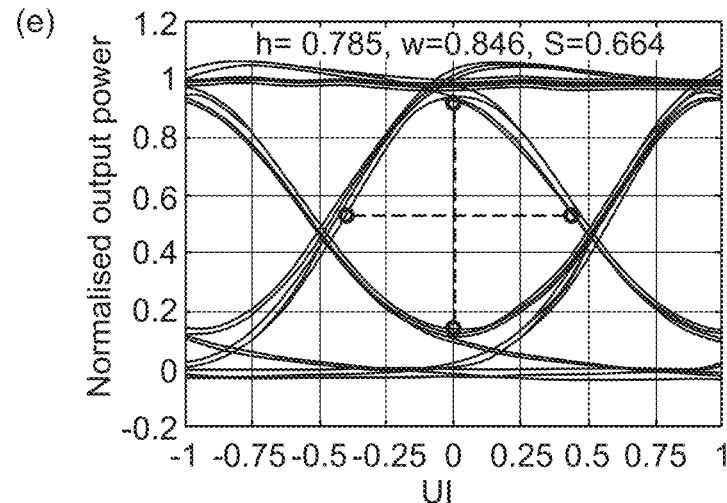
Figure 2:
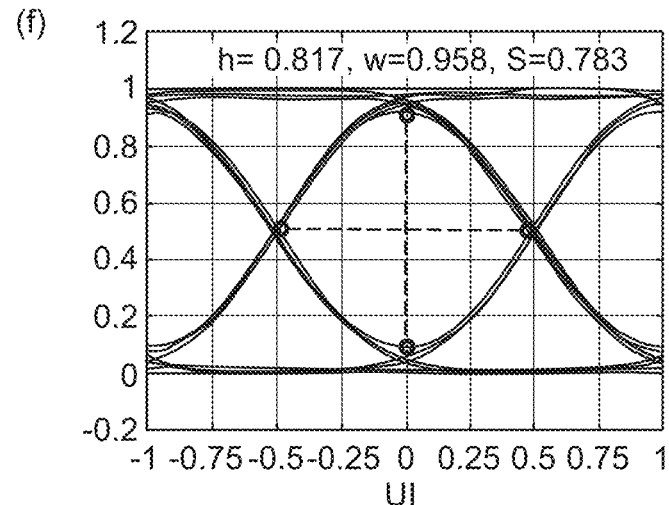

FIG. 2a illustrates example timing offsets dt for positive and negative transitions in NRZ data (waveforms offset on the y-axis for clarity), and FIG. 2b shows contours of eye area (arbitrary units) mapped for timing shift (offset) dt and relative amplitude γ. It can be seen that the time-shifted correction term $$I_A^{st}$$

improves on $\tilde{I_A}$ and that at an optimum location $\gamma$ is close to 1 ($\gamma \approx 1.14$) and dt$\approx$0.07 UI (the relative positions of $$I_A^{st}$$

and $I_A$ are also shown, although they have slightly different waveshapes). FIG. 2c compares the example ideal $I_A$, approximated $\tilde{I_A}$ and optimum $$I_A^{st}.$$

FIGS. 2d-2f show eye diagrams for 50 Gb/s NRZ data for the ideal $I_A$, $\tilde{I_A}$, and an optimum $$I_A^{st}$$

respectively. The eye height (h), width (w) and area (S) are stated on the respective eye diagrams.

Figure 3:
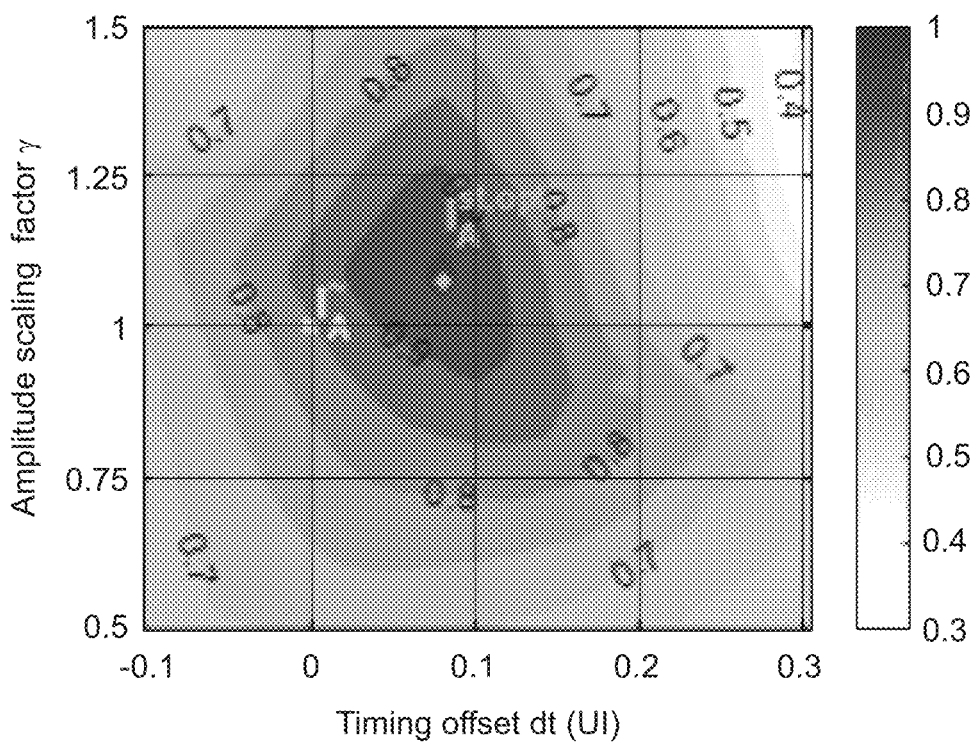
FIG. 3 illustrates robustness of the example approximated laser drive current waveform to parameter modifications.

A linear equalizer may be applied, e.g. at a receiver, to more fully open the eye diagram. FIG. 3 shows contours of eye area (arbitrary units) mapped for timing offset dt and relative amplitude $\epsilon$, for the same NRZ data, after application of an 11-tap feed forward equalizer (FFE) with taps spaced at symbol period T. It can be seen that open eye diagrams can be produced for a wide range of timing offsets dt and relative amplitudes y, indicating that the optical output waveforms have very low non-linearity.

Figure 4A:
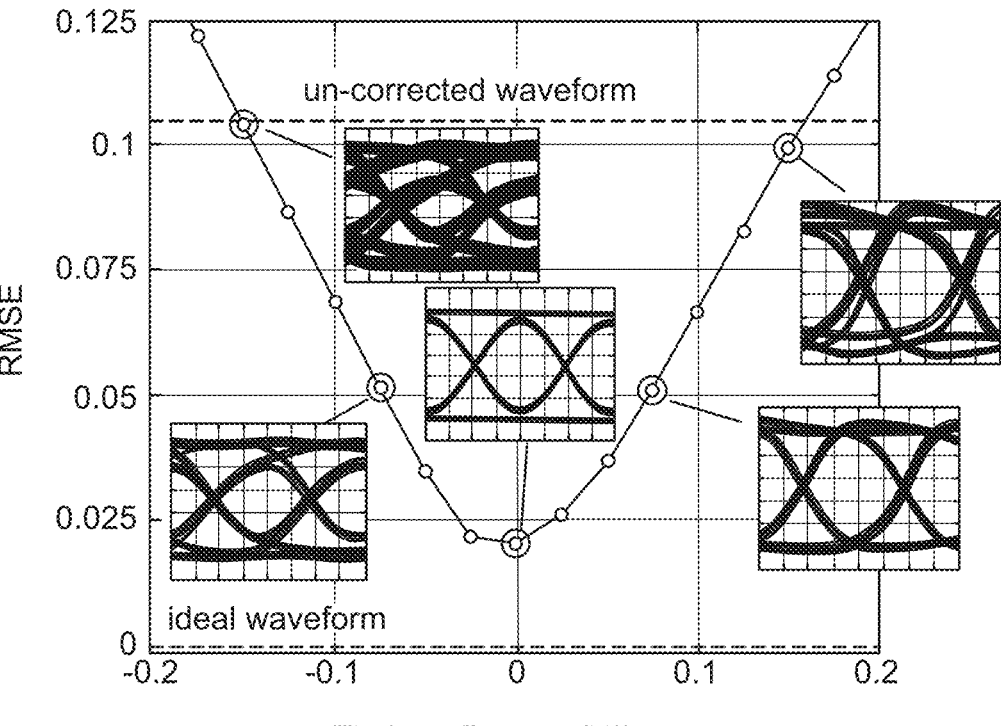
Figure 4B:
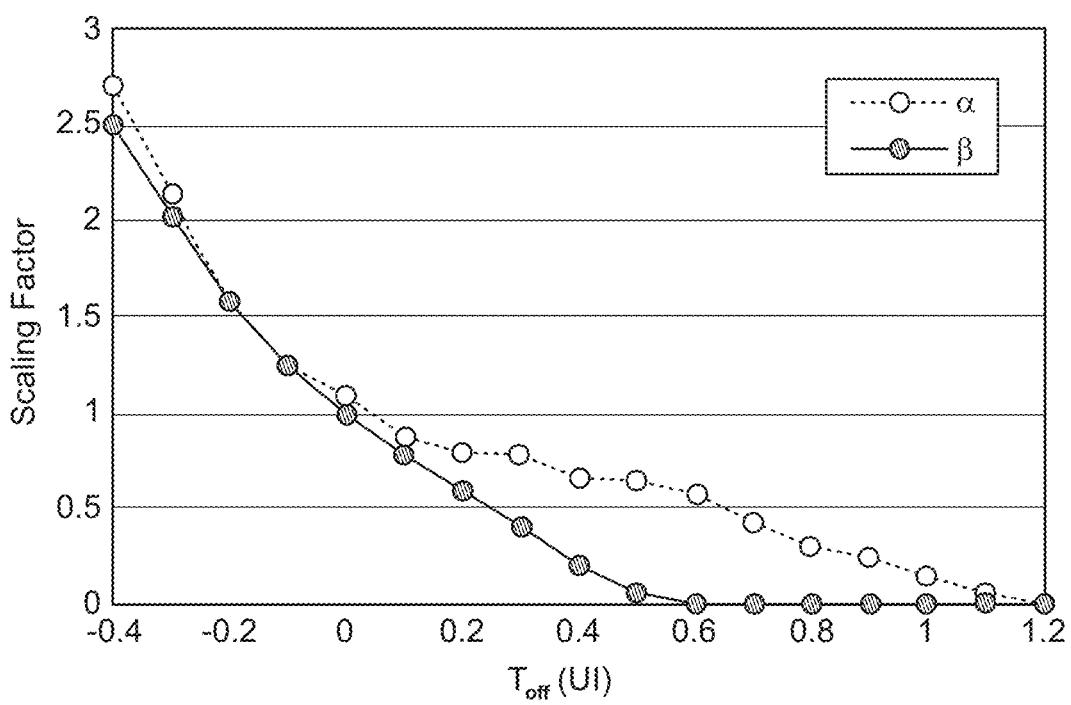
Figure 4C:
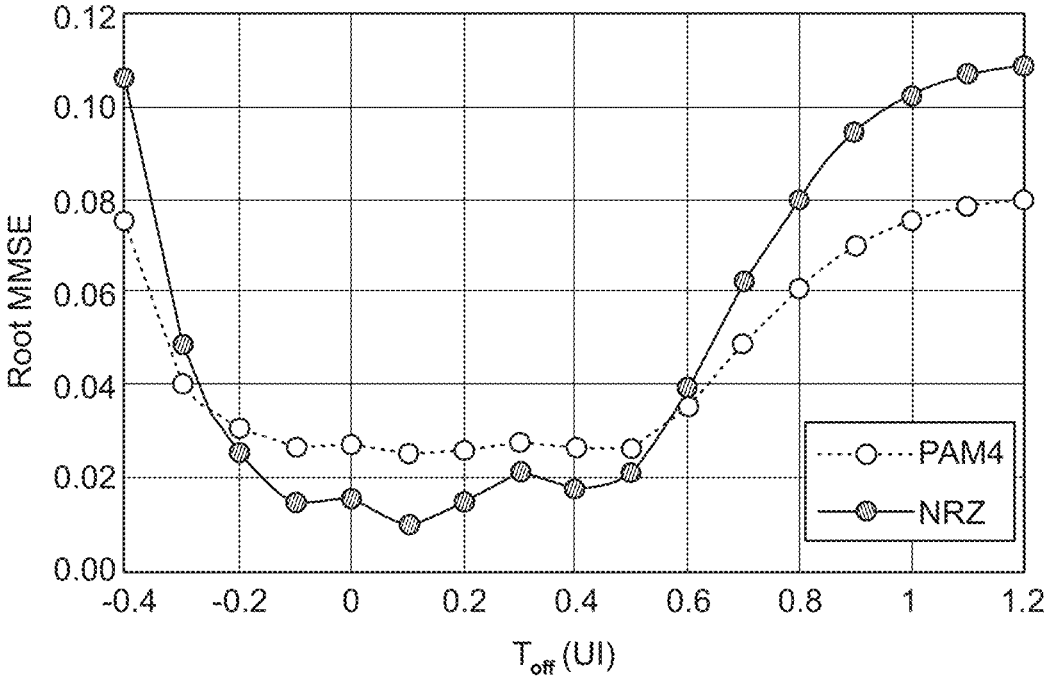

Depending upon the implementation of techniques used to construct $\tilde{I_{bc}}$ (t), some timing alignment of the components of $\tilde{I_{bc}}$ (t) may be needed to align $$I_A^{st}$$

to $\tilde{I_B}$ and $I_C$. An error in this alignment may be characterized as a global timing offset $t_{off}$ between $$I_A^{st}$$

and $\tilde{I_B}$ (or $I_C$). Optimum values for the scaling factors for the $$I_A^{st}$$

and $\tilde{I_B}$ currents may be found by estimating the MMSE (minimum mean square error), with respect to the desired target optical waveform, as a function of the global timing offset $t_{off}$. FIG. 4a shows the square root of the MSE (RMSE) against global timing offset and illustrates that the described technique has a relatively large tolerance to timing alignment error of this type. This tolerance can be improved further by multiplying parameters a and b by respective scaling factors $\alpha$ and $\beta$, dependent upon the offset $t_{off}$ as shown in FIG. 4b, with the results shown in FIGS. 4c and for NRZ and PAM-4 modulation.

In a PAM-4 implementation there are 2 bits per symbol and 6 possible transitions between 4 different signal levels (00, 01, 10, 11), and hence between 4 different optical output (power) levels. For PAM-4 a complete implementation of the Stretched A method uses 6 ($\tilde{I_A}$, $\tilde{I_B}$) pairs. However, a smaller number of ($\tilde{I_A}$, $\tilde{I_B}$) pairs can be used to simplify the implementation of the 5 method. Examples of different implementations are given in Table 1, below, for 1, 3 and 5 ($\tilde{I_A}$, $\tilde{I_B}$) pairs. Different assignments are also possible.

TABLE 1

| Transition | $\tilde{I_X}$ (i → j), X = A, B | | |
| | N = 1 | N = 3 | N = 5 |
| --- | --- | --- | --- |
| 0 → 1 | $\frac{1}{3} \cdot \tilde{I_X}$ (0 → 3) | $\tilde{I_X}$ (0 → 1) | $\tilde{I_X}$ (0 → 1) |
| 0 → 2 | $\frac{2}{3} \cdot \tilde{I_X}$ (0 → 3) | $2 \cdot \tilde{I_X}$ (0 → 1) | $\tilde{I_X}$ (0 → 2) |
| 0 → 3 | $\tilde{I_X}$ (0 → 3) | $\tilde{I_X}$ (0 → 3) | $\tilde{I_X}$ (0 → 3) |
| 1 → 2 | $\frac{1}{3} \cdot \tilde{I_X}$ (0 → 3) | $\frac{1}{3} \cdot \tilde{I_X}$ (0 → 3) | $\frac{1}{3} \cdot \tilde{I_X}$ (0 → 3) |
| 1 → 3 | $\frac{2}{3} \cdot \tilde{I_X}$ (0 → 3) | $2 \cdot \tilde{I_X}$ (2 → 3) | $\tilde{I_X}$ (1 → 3) |
| 2 → 3 | $\frac{1}{3} \cdot \tilde{I_X}$ (0 → 3) | $\tilde{I_X}$ (2 → 3) | $\tilde{I_X}$ (2 → 3) |

Figure 4D:
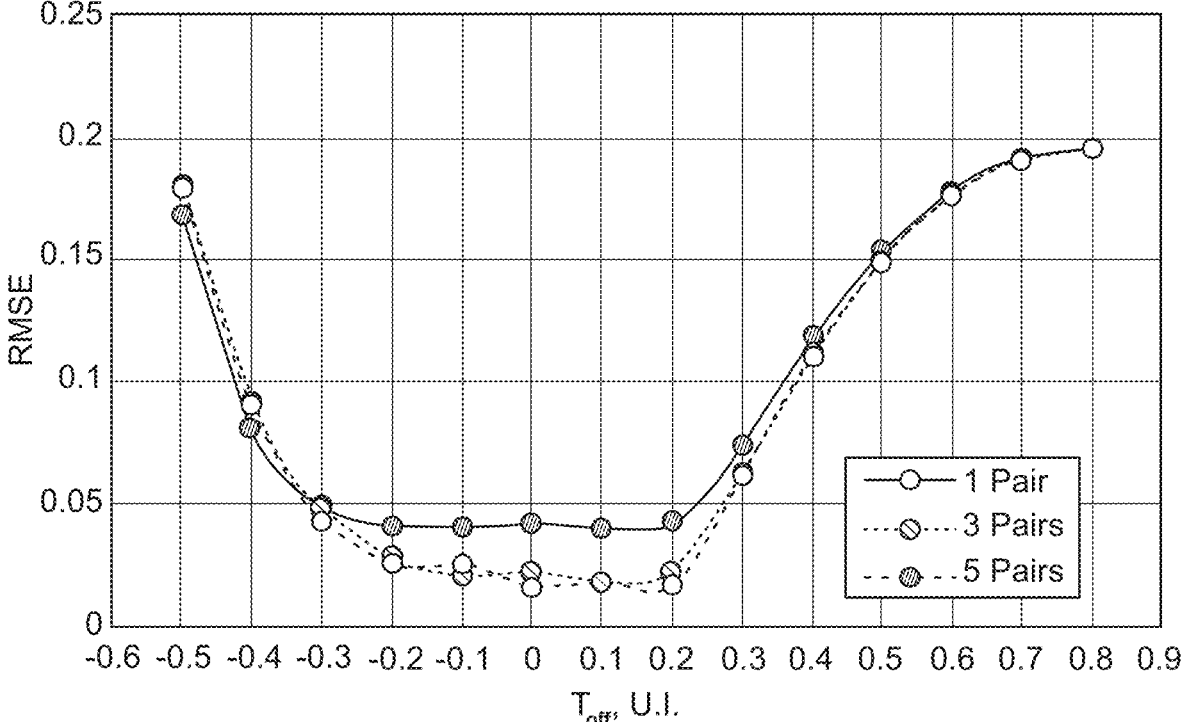

The least complex implementation uses a single $\tilde{I_A}$ or $$I_A^{st},$$

and $\tilde{I_B}$ pair (N=1), scaled by the relative magnitude of the respective transition (0→1), for each transition. For N=1, there are three possible transition amplitudes, $\Delta$, $2\Delta$, $3\Delta$, and thus three gain stages may be used to implement this scaling. This is illustrated by FIG. 4d, which shows RMSE (Root Mean Square Error) against offset $t_{off}$ (in UI) for the example of a VCSEL having a 9 GHz, 3 dB bandwidth at a symbol rate of 16 Giga-Symbols per second (GSymbols/s). As illustrated, if more ($\tilde{I_A}$, $\tilde{I_B}$) pairs, per the Stretched A methodology are used then the optical signal quality is further improved.

Optionally an adaptive or parameter search method may be used to find near-optimum parameters for the technique i.e. values for one or more of a, b, dt, $t_{off}$. For example feedback from the transmitter or from the receive end of the optical link may be used to set values for one or more of these parameters e.g. based upon a contour map or graph as described above, particularly as the optimum regions are relatively large. This may be used to minimise the MSE or maximise the eye-opening area.

Experiments were conducted to confirm the theoretical predictions. The available equipment could only operate at symbol rates less than 20 GSymbols/s and thus a commercial VCSEL specified for operation at 10 Gb/s with NRZ modulation was used. The rate equation parameters for the VCSEL were unavailable and hence were approximately deduced from measurements of the frequency response of the laser. Since the electrical cables and packaging of the VCSEL were expected to introduce significant linear electrical distortion, the electrical channel and parasitics were also measured. Then, to ensure accurate modulation currents were delivered to the laser, a linear equalizer was used to correct for the measured electrical linear distortion. The approximate VCSEL model estimated the intrinsic 3 dB bandwidth of the VCSEL to be 9 GHz at a bias current of 5.3 mA.

Figure 6B:
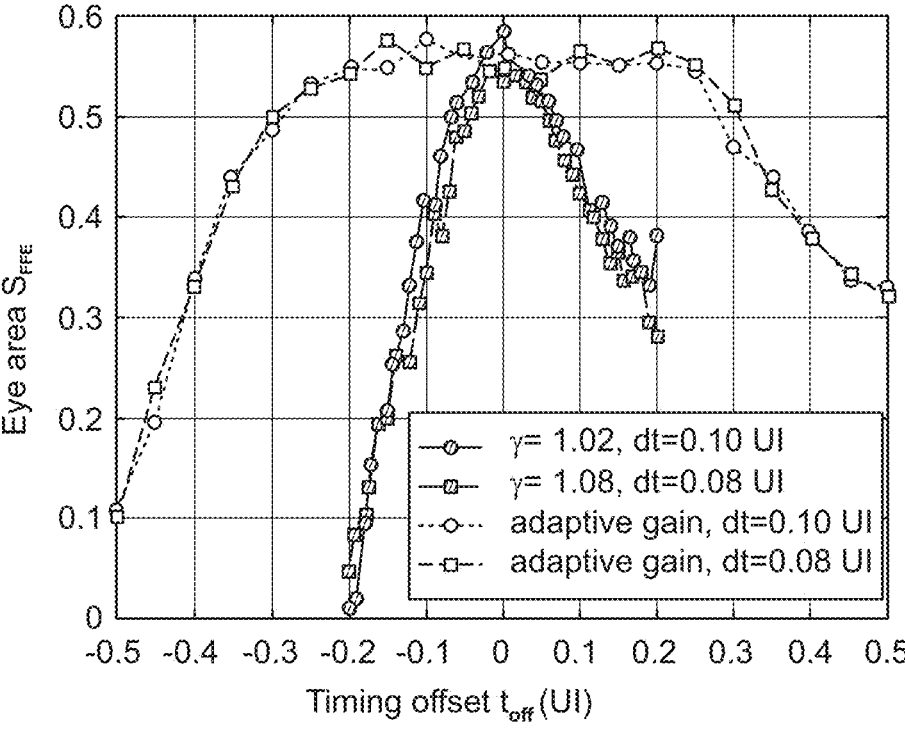
Figure 7A:
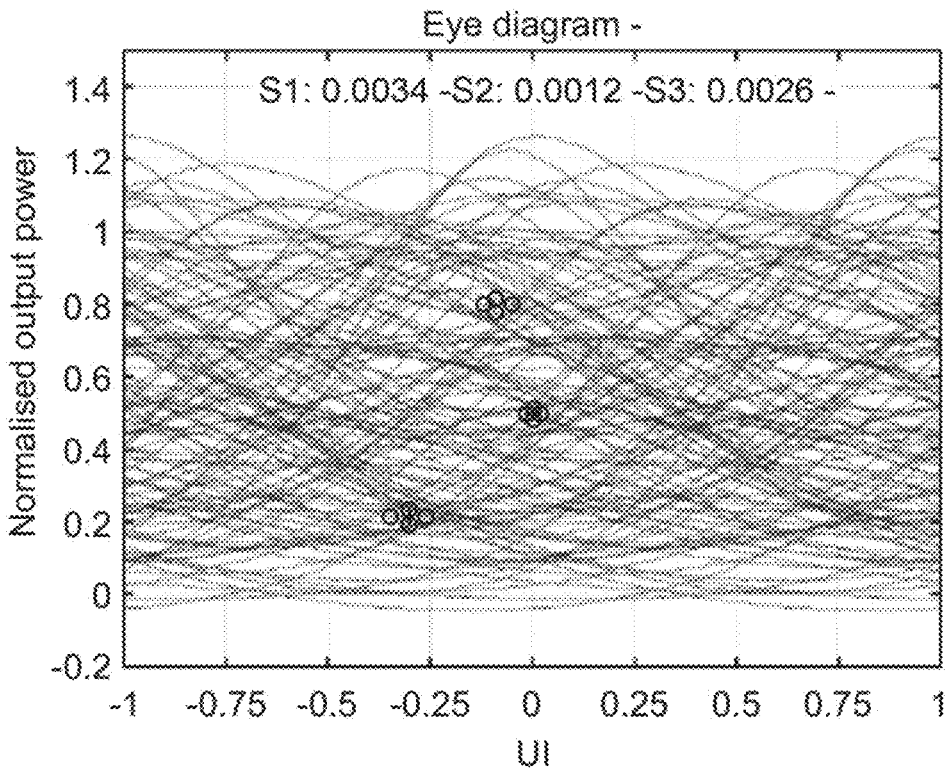
Figure 7B:
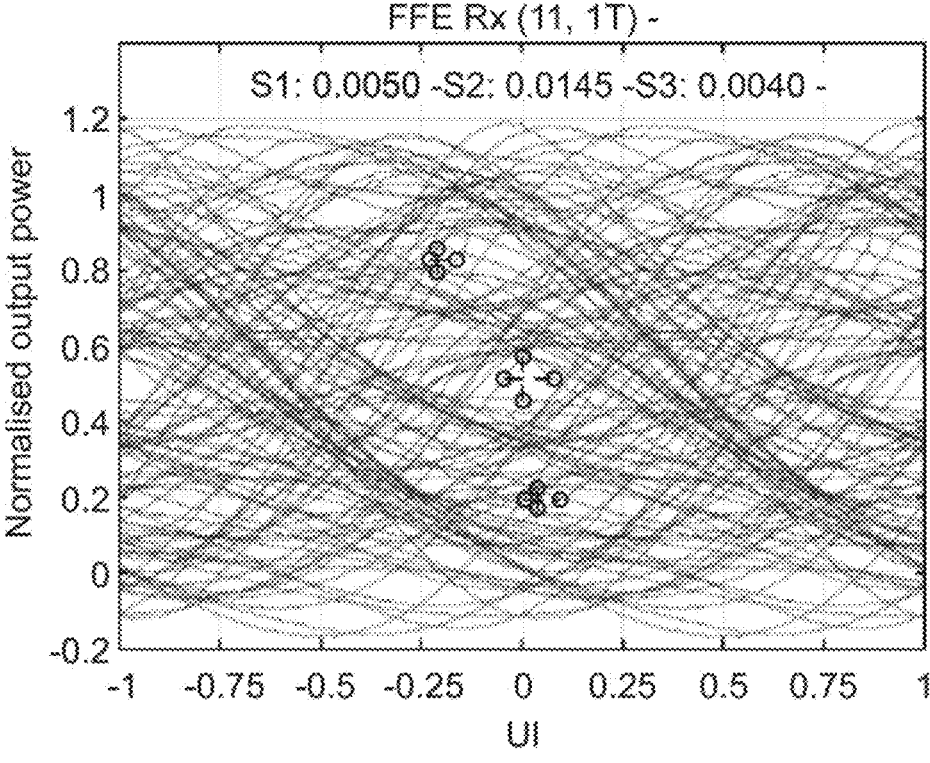
Figure 7C:
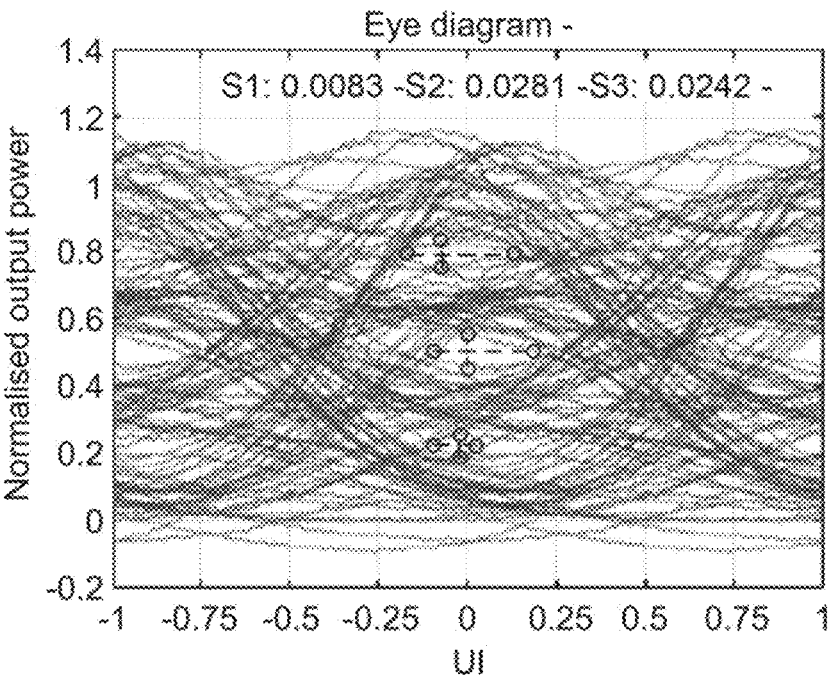
Figure 7D:
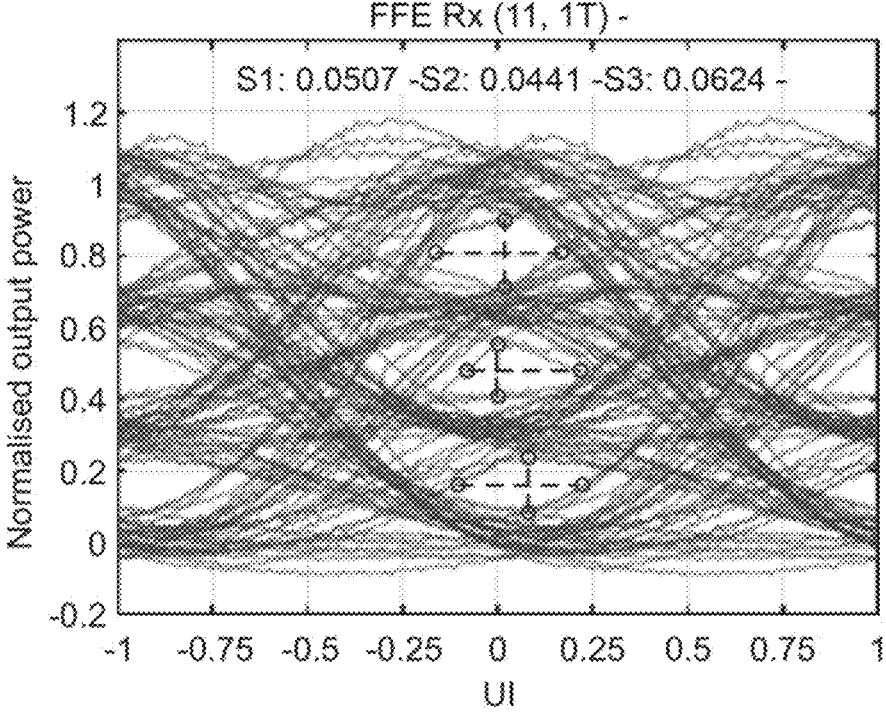
Figure 7E:
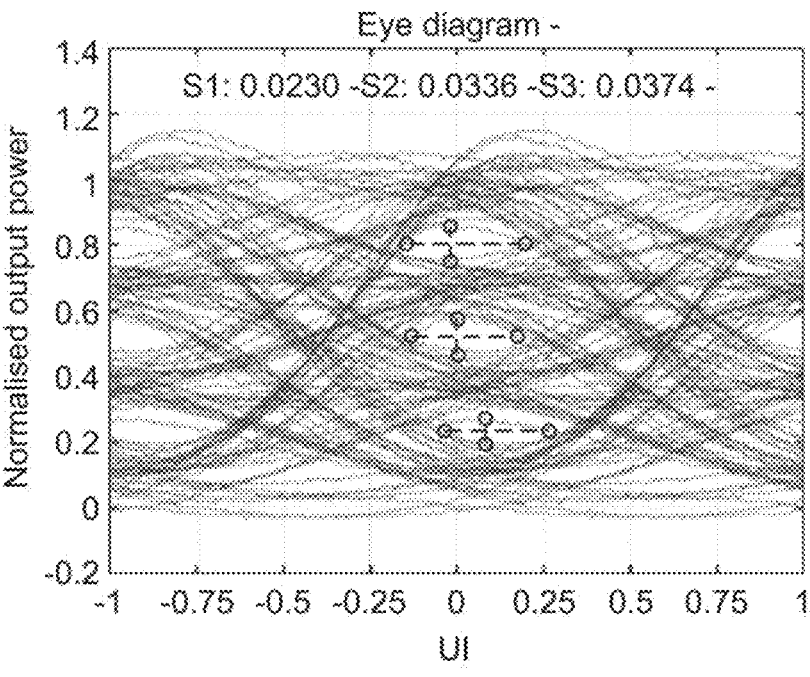
Figure 7F:
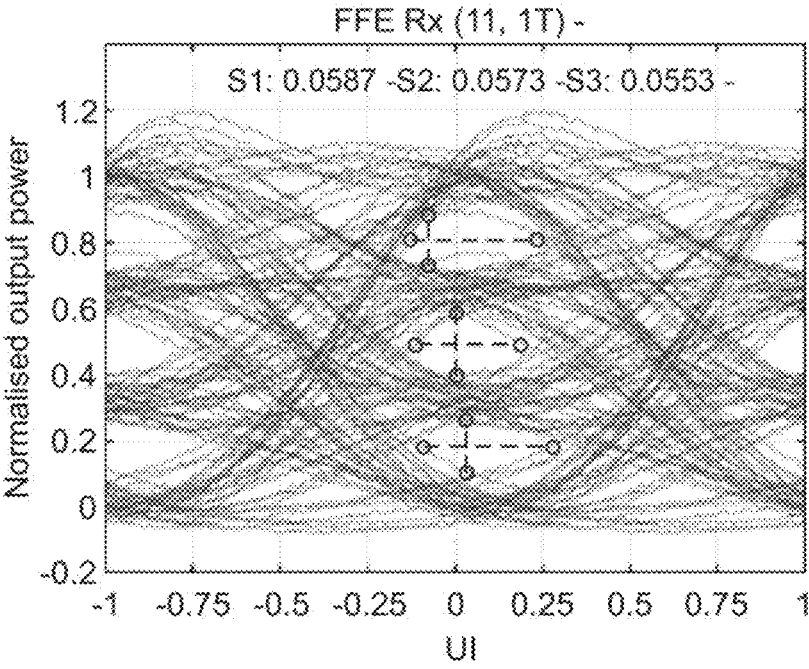
Figure 7G:
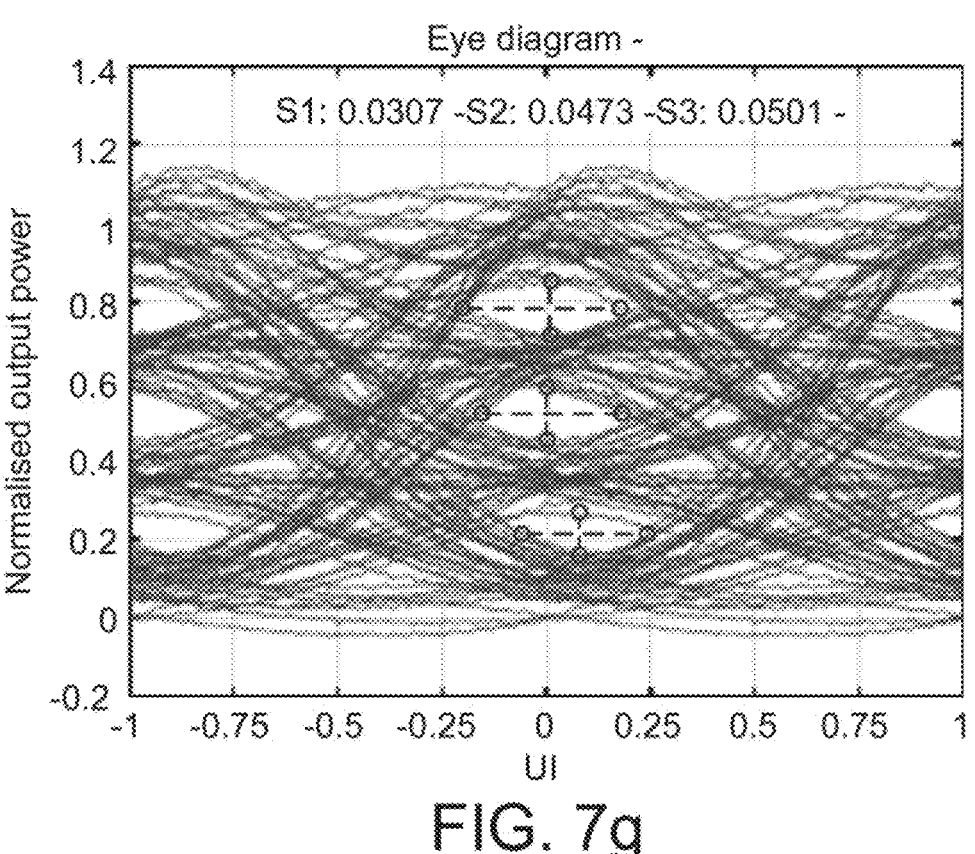
Figure 7H:
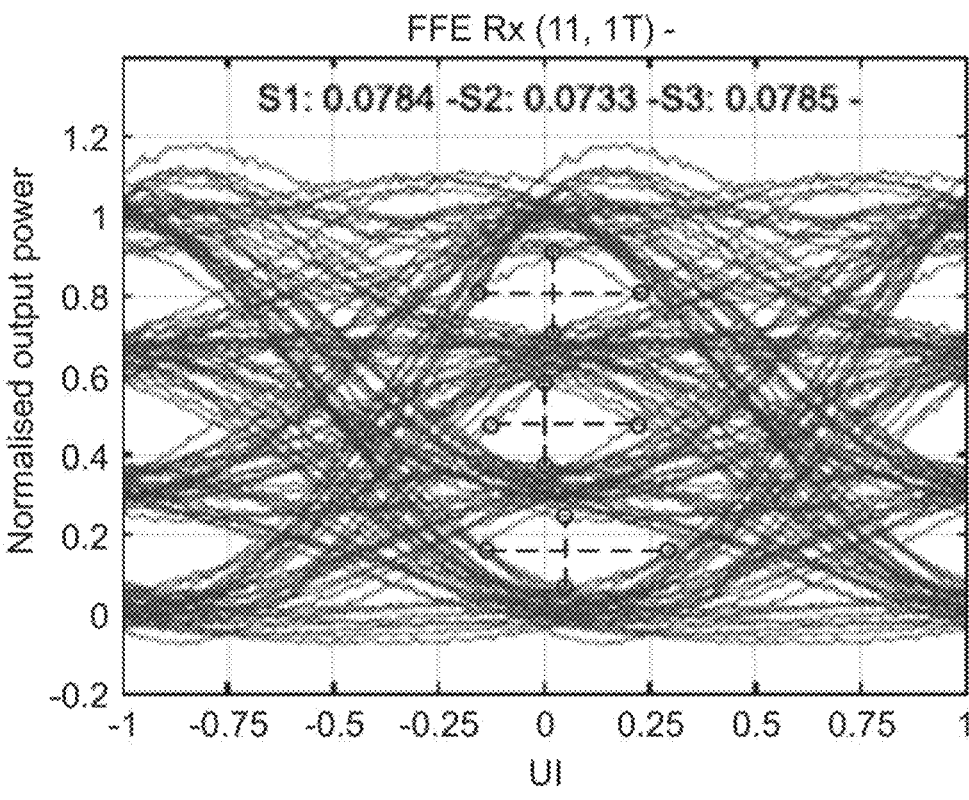

The approximate rate equation model was used to generate the modulating currents for NRZ, ABCD and Stretched A methods for NRZ and PAM-4 transmission. A desired 10% to 90% optical transition rise time was set to 0.75×T (T being the symbol period) for the case of NRZ data convolved with a Gaussian impulse response as previously described. FIG. 5 shows the experimentally measured received eye diagrams at 16 Gb/s (a-c) before and (d-f) after equalization for (a and d) conventional NRZ modulation, (b and e) the ABCD and (c and f) Stretched A methods. For (a-c): vertical scale: 200 μW/div, horizontal scale: 20 ps/div). For two sets of parameters for the $\widetilde{I}_A$ component of the Stretched A method, FIG. 6*a* shows the gain factors, a and b, for the $\widetilde{I}_A$ and $\widetilde{I}_B$ components employed in the adaptive gain scheme as a function of $t_{off}$. FIG. 6*b* shows plots of the NRZ eye opening area without and with adaptation of the a and b scaling factors for the $\widetilde{I}_A$ and $\widetilde{I}_B$ after equalization with a FFE(11, T), (taps, spacing), as a function of the timing offset $t_{off}$.

An initial experimental test of the transmission of PAM-4 signals using the Stretched A method was made at 16 GBaud (32 Gb/s) with the same experimental setup and methodology using the numbers of pairs and pair assignments (N=1, 3 and 5) described in Table 1. FIGS. 7*a*, 7*c*, 7*e* and 7*g* plot the PAM-4 eye diagram before application of the FFE(11, T) and FIGS. 7*b*, 7*d*, 7*f* and 7*h* plot the eye diagram after application of the FFE(11, T). When PAM-modulation is used without the non-linear correction the eye openings are very small per FIGS. 7*a* and 7*b*. As expected, even with N=1 per FIGS. 7*c* and 7*d* the Stretched A method has opened the eyes of the PAM-4 signal. The eye areas of the three eyes are stated on the plots. Improved signal quality can be obtained by employing a larger number of ($\widetilde{I}_A$, $\widetilde{I}_B$) pairs as demonstrated in FIGS. 7*e* and 7*f* for N=3 and FIGS. 7*g* and 7*h* for N=5.

FIG. 8 shows a first example of a laser driver 100, configured to construct $\widetilde{i_{bc}}$ (t) using analog circuitry to implement equation (1). Encoded data 102 is provided to a filter 104, e.g. with a raised cosine or Gaussian impulse response, to generate $I_C$. A first scaling circuit 110 scales $I_C$ by parameter b, and the scaled current is differentiated by a first differentiating circuit 112 to generate $\widetilde{I}_B$. A second scaling circuit 120 scales $\widetilde{I}_B$ by parameter a, and the scaled current is differentiated by a second differentiating circuit 122 to generate $\widetilde{I}_A$. The threshold current t h may be provided by a bias current generator (not shown). A summing circuit 130 determines the current drive waveform 140 to laser 150, as $$\widetilde{i_{bc}}(t) = a\frac{d\widetilde{I_B}(t)}{dt} + b\frac{d\widetilde{I_C}(t)}{dt} + I_C(t) + I_{th}.$$

If $$I_A^{st}$$

is used instead of $\widetilde{I}_A$ a stretched or time-shifted version of $I_C$ may separately be generated from the encoded data 102 and used to generate $$I_A^{st}.$$

Optionally one or more delay stages may be used to time-align the components of $\widetilde{i_{bc}}$ (t) where necessary. Alternatively, if one of the ideal first or second drive current correction terms is known integration and/or differentiation may be used to derive the other components of $\widetilde{i_{bc}}$ (t). In general, the order of the analog operations shown in FIG. 8 may be varied. For example, the filtering may be performed after the summing circuit 130.

Figure 9A:
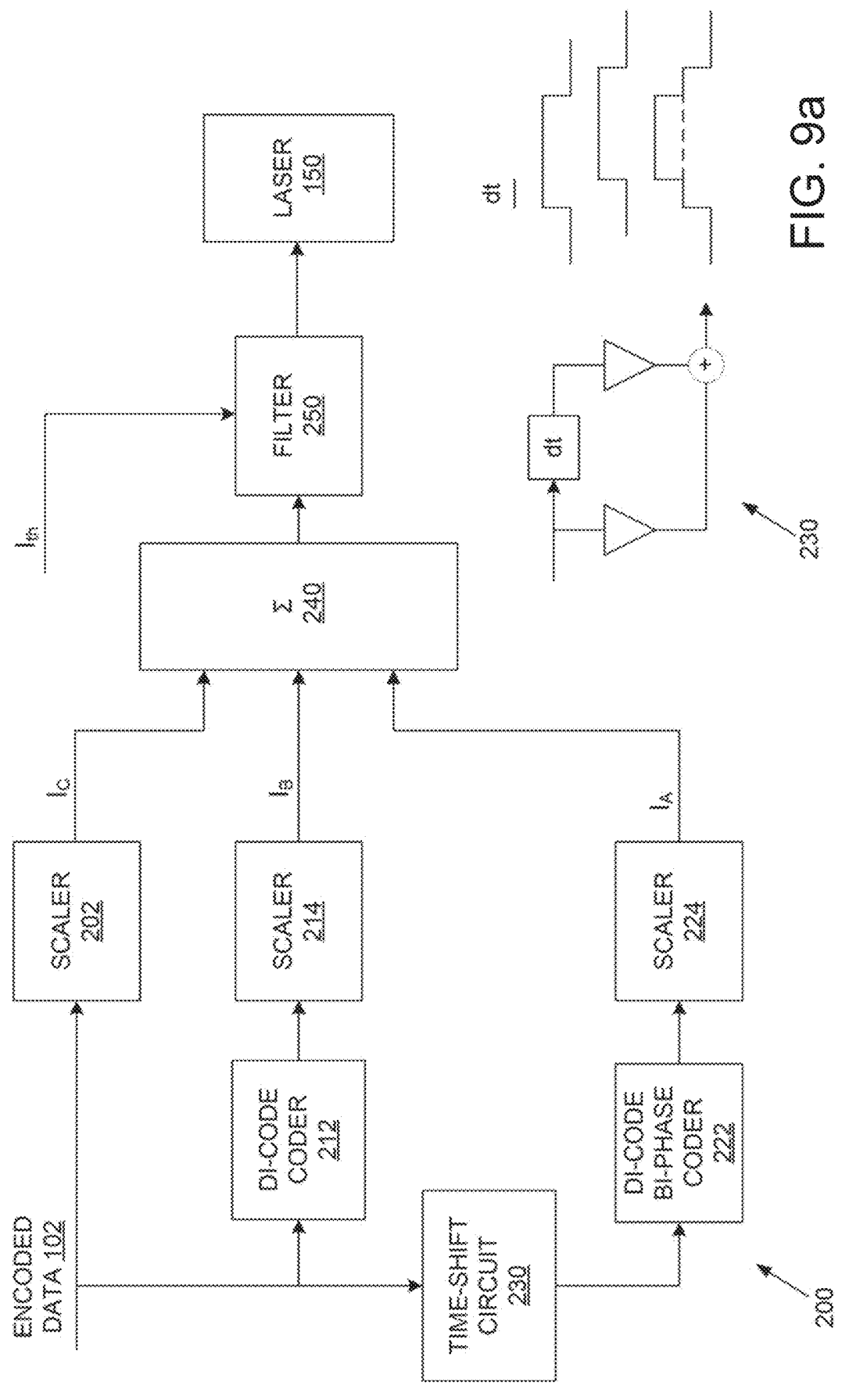

FIG. 9*a* shows a second example of a laser driver 200, configured to construct $\widetilde{i_{bc}}$ (t) using partly digital circuitry to implement equation (1) to determine $\widetilde{i_{bc}}$ (t). In this example the encoded data 102 is NRZ (PAM-2) data but the approach may also be adapted to e.g. PAM-4 encoded data.

In general, the $I_C$ component of $\widetilde{i_{bc}}$ (t) may be determined directly from the encoded data 102, optionally scaling the encoded data using a scaler 202. The first estimated drive current correction term $\widetilde{I}_B$ may be determined from a di-code representation of the encoded data, in which edges of the encoded data are encoded as di-code pulses having the sign of the gradient of the edge. The second estimated drive current correction term $\widetilde{I}_A$ or $$I_A^{st}$$

may be determined from a di-code bi-phase representation of the encoded data, or of a time-shifted version of the encoded data for $$I_A^{st},$$

in which edges of the encoded data are encoded as di-code pulses having the sign of the gradient of the edge.

FIG. 9*a* shows one example implementation of this approach. In FIG. 9*a* the first estimated drive current correction term $\widetilde{I}_B$ is determined from a 3-level (e.g. −V, 0, +V) di-code version of the encoded data. In this di-code representation there is an output pulse of duration T for each transition of the encoded data, where T is the symbol duration (the same as the bit duration for NRZ/PAM-2). A polarity of the pulse indicates a polarity (direction) of the transition; a positive (upward) transition of the encoded data is encoded as a positive pulse and a negative (downward) transition of the encoded data is encoded as a negative pulse. If there is no transition there is no output pulse.

The di-code version of the encoded data is determined by a di-code coder 212 which may be implemented, e.g., by a digital two-tap FIR filter having taps with equal but opposite weights spaced by a symbol period delay T. The di-code pulses are scaled by a scaler 214 to form $\widetilde{I}_B$, and are aligned so that the centre of each di-code pulse is aligned with the transition. In the described FIR-based implementation this may involve advancing a timing of the di-code pulse by T/2, which may in practice be done by delaying the encoded data i.e. delaying $I_C$ by T/2, e.g. using a delay line.

The second estimated drive current correction term $\widetilde{I}_A$ may be determined from a 3-level (e.g. −V, 0, +V) di-code bi-phase version of the encoded data. In this di-code bi-phase representation there is a bi-phase pulse of duration T for each transition of the encoded data. The bi-phase pulse comprises a T/2 duration pulse of one polarity followed by a T/2 duration pulse of the opposite polarity. For example, a positive bi-phase pulse may comprise a T/2 duration pulse of +V followed by a T/2 duration pulse of −V; a negative bi-phase pulse may comprise the positive bi-phase pulse multiplied by −1. A positive transition of the encoded data is represented by a positive bi-phase pulse and a negative transition of the encoded data is represented by a negative bi-phase pulse.

The di-code bi-phase version of the encoded data is determined by a di-code bi-phase coder 222, which may be implemented in many ways, e.g. by logic and a (delayed) clock. The example of FIG. 9a generates the time-shifted or stretched version of the second estimated drive current correction term, $$I_A^{st}.$$

Thus, a time-shifted version of the encoded data is generated by a time-shift circuit 230 and used to generate the di-code bi-phase version of the (time-shifted) encoded data. The time-shift circuit 230 is configured to add a timing advance to positive transitions of the encoded data and a timing delay to negative transitions of the encoded data and may be implemented, for example, by a digital two-tap FIR filter having taps with e.g. equal weights, spaced by a delay dt, followed by a limiter. The principle of operation of such an implementation is shown in the inset figure. The di-code bi-phase pulses are scaled by a scaler 224 to form $\widetilde{I}_A$ or $$I_A^{st}.$$

The di-code bi-phase pulses are aligned so that the centre of each di-code bi-phase pulse is aligned with the transition; in some implementations this alignment may be implemented using one or more delay lines.

The components of $\widetilde{I_{bc}}$ (t) thus generated are combined by summer 240 and the combined signal may be filtered by a filter 250, e.g. with a raised cosine or Gaussian impulse response, to generate the current drive waveform to laser 150. The threshold current $I_{th}$ may be added at any convenient point, e.g. after summer 240. In some implementations the time-dependent components of $\widetilde{i_{bc}}$ (t) may be separately filtered before being summed, which may provide a more accurate response but with additional filters. The output of filter 250 may be amplified or attenuated as desired.

Figure 9B:
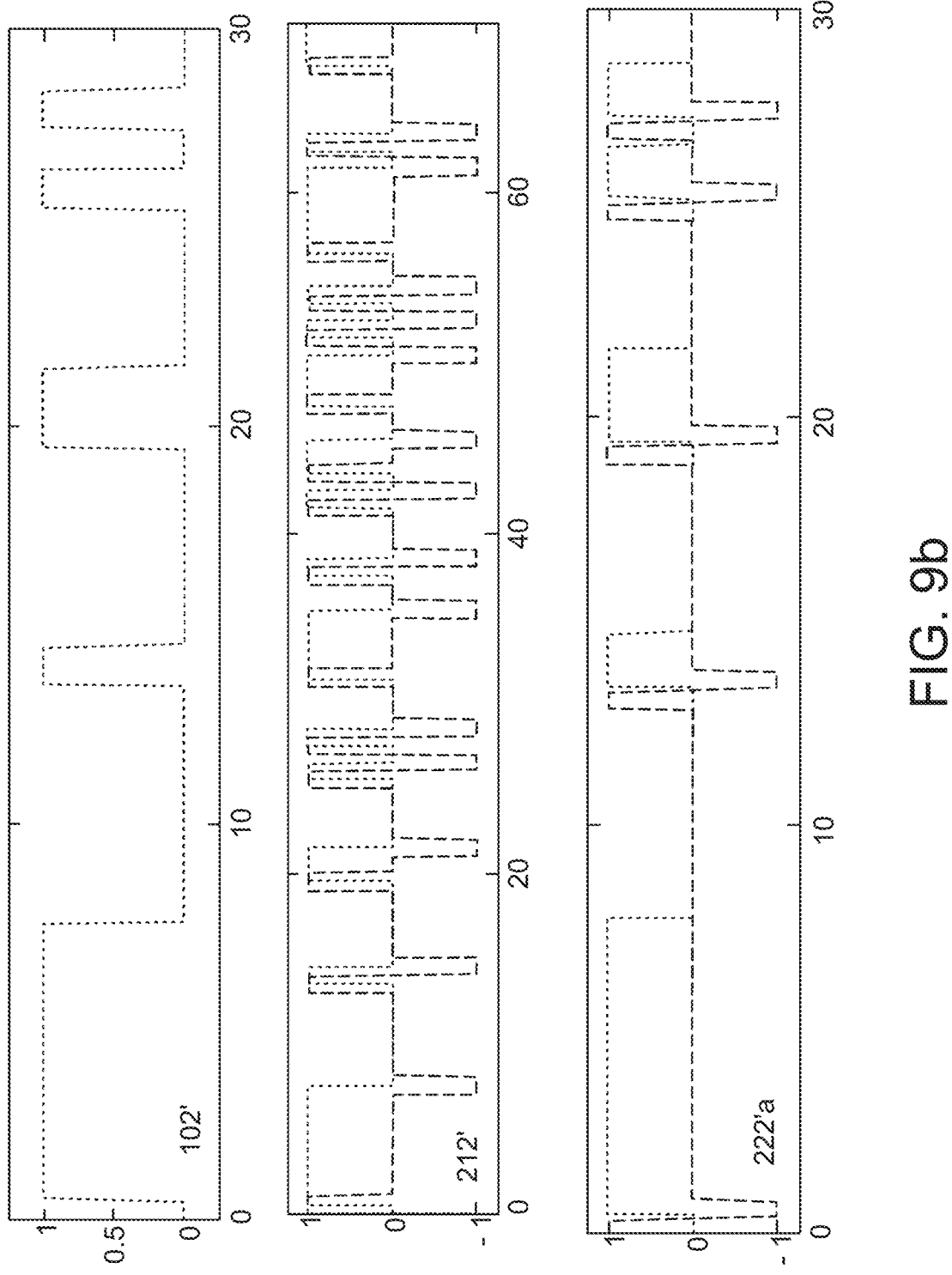
Figure 9B:
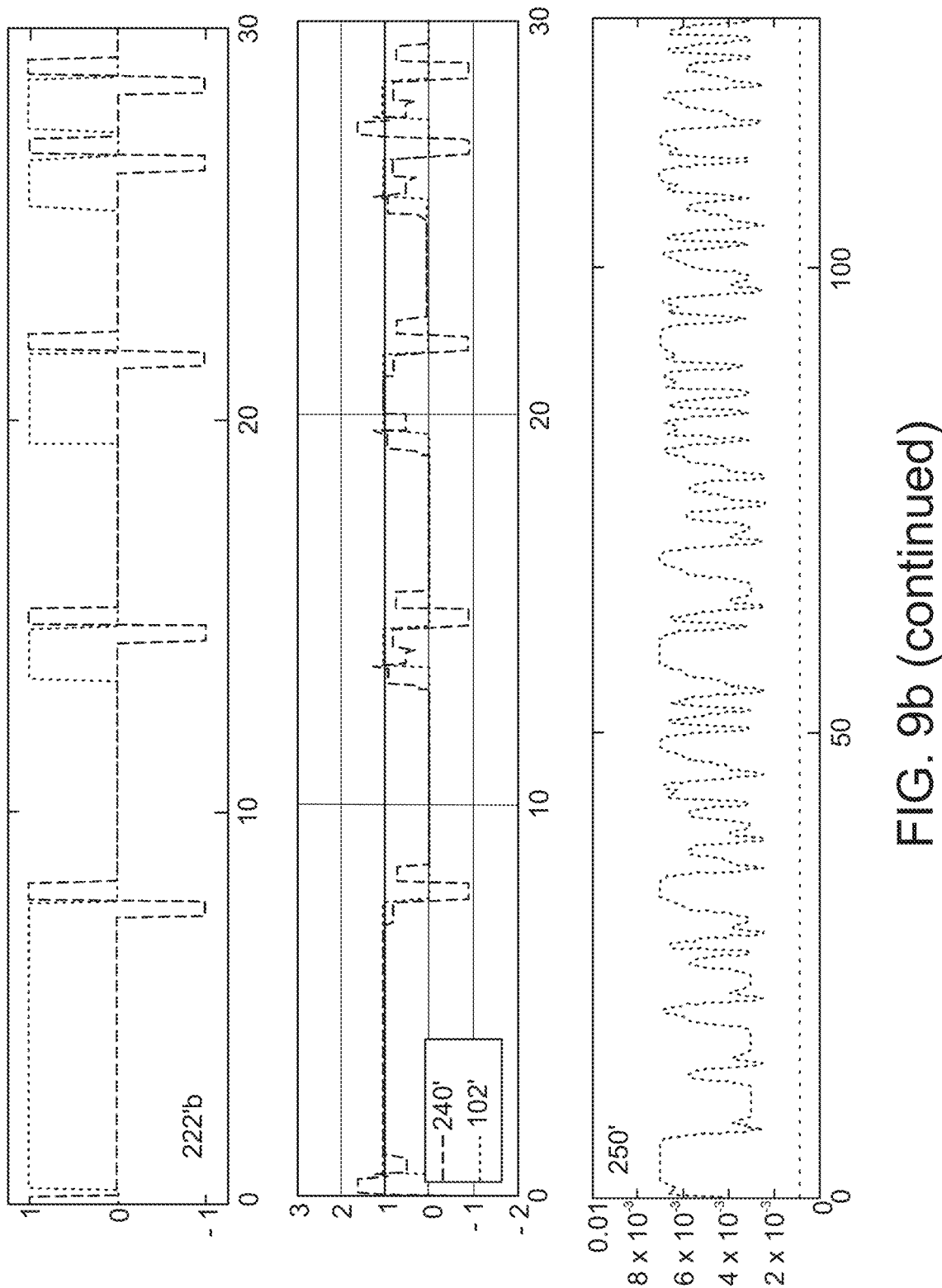

FIG. 9b shows waveforms illustrating operation of the laser driver 200 with, in this example, NRZ encoded data. In each case the x-axis denotes time in unit intervals. Waveform 102' indicates the NRZ encoded data input, and waveform 212' shows the di-code pulse output from di-code coder 212, i.e. digital pulses for generating $\widetilde{I}_B$. Waveforms 222' show the di-code bi-phase pulse output from di-code bi-phase coder 222, i.e. digital pulses for generating $$I_A^{st}.$$

Waveform 222'a shows pulses for rising edges of the time-shifted encoded data and waveform 222'b shows pulses for falling edges of the time-shifted encoded data; these are overlaid on the stretched NRZ data. Waveform 240' shows an output of summer 240 comprising a combination of scaled digital waveforms for generating $I_C$, $\widetilde{I}_B$, and $$I_A^{st};$$

the NRZ encoded data is also shown, for reference only. Waveform 250' shows the constructed target drive current waveform for driving the laser 150; the y-axis is current in amps.

Figure 9C:
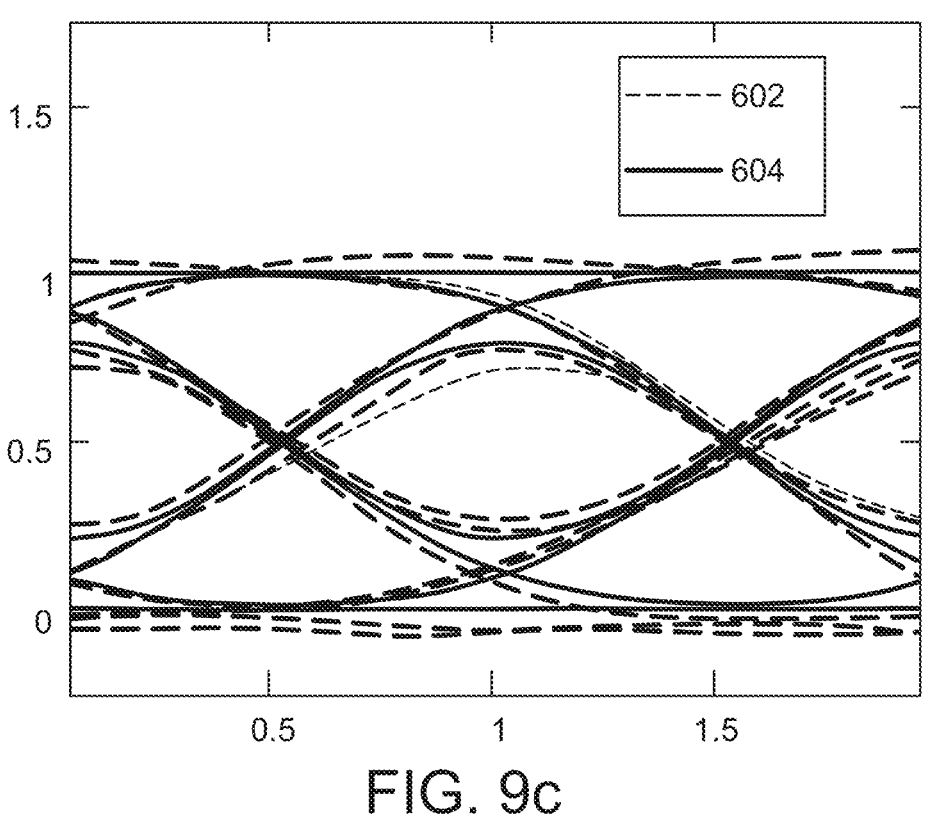
Figure 9D:
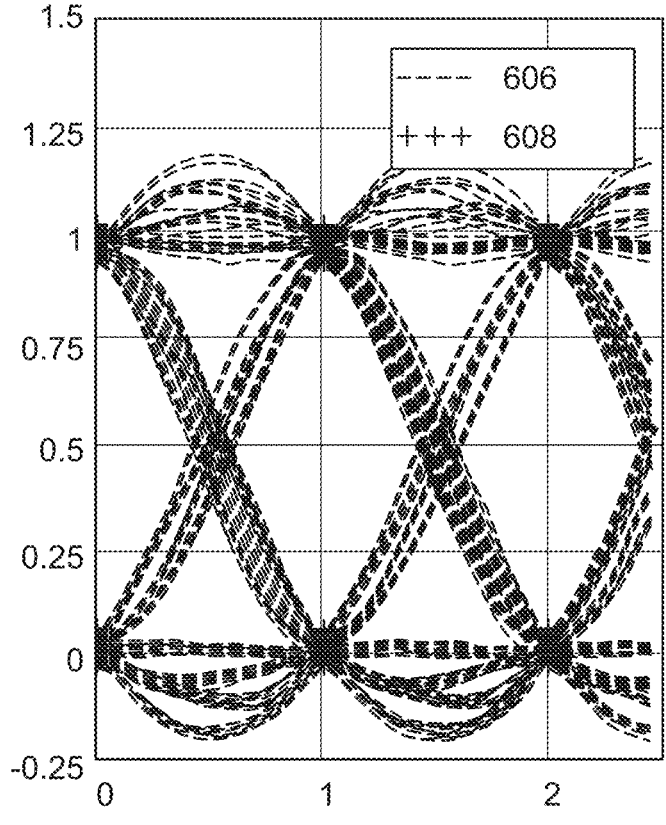

FIG. 9c shows an eye diagram resulting from the optical output waveform 602 of the laser driven by the target drive current waveform and, for comparison, a target output waveform 604 representing a target optical output of the laser 150 over time. The y-axis shows normalized OMA (Optical Modulation Amplitude); the x-axis is time in unit intervals. After reception by an optical receiver (not shown), and feed-forward equalization, the eye diagram of FIG. 9d results. FIG. 9d shows a linear equalizer waveform 606 and locations of CDR (Clock and Data Recovery) samples 608; the y-axis is normalized optical power, the x-axis UI.

A partly digital approach to constructing $\widetilde{i_{bc}}$ (t), as represented by the example of FIG. 9a, can generate and, if necessary time-align, digital versions of $$I_A^{st}$$

or $\widetilde{I}_A$, $\widetilde{I}_B$, and $I_C$, before scaling and combining the signals using analog circuits. Such an approach can conveniently be implemented within a CMOS-based SerDes (serializer-de-serializer) circuit, which for high data rates typically includes linear equalizer circuitry (to mitigate linear distortion between connected modules). The components of such circuitry are typically those needed for constructing $\widetilde{i_{bc}}$ (t). Also, or instead such a SerDes equalizer could be used to compensate for linear distortion of $\widetilde{i_{bc}}$ (t) introduced by the electrical channel between the laser driver circuitry and the laser.

FIG. 10a shows a third example of a laser driver 300, configured to construct $\widetilde{i_{bc}}$ (t) using a feed-forward equalizer (FFE) 302 with taps at half-symbol period (T/2) spacings, followed by an optional scaler 304. The threshold current $I_{th}$ may be added at any convenient point e.g. by the scaler 304, to provide a current drive waveform 306 for the laser 150. The implementation of FIG. 10a is based on the observation that an isolated transition of the encoded data produces a corresponding specific pulse response in the back-calculated laser modulation current, and that this pulse response can be approximated by an FFE with T/2 spacing between taps. In the laser driver the FFE pulse response is convolved with the encoded data. For this example, the encoded data would comprise a short impulse if the data to be output was a 1, The duration of the impulse being less than the symbol period. No impulse would be output if the data bit was 0.

The FFE 302 may have a structure which is essentially the same as that of the FIR filter of the time-shift circuit 230, that is having an output comprising the sum of a set of signals which comprise successively delayed versions of the input signal weighted by a respective tap coefficient. The delayed versions of the input are each delayed by half a symbol period (T/2) with respect to the previous version.

FIG. 10b shows an example current drive waveform 306 with current in amperes on the y-axis and unit intervals (UI)

on the x-axis. FIG. 10*c* shows an enlargement of the region of the current drive waveform within the dashed oval, with normalized current on the y-axis and unit intervals on the x-axis. Each point 700 on the waveform of FIG. 10*c* corresponds to a tap and the height of the point on the y-axis corresponds to the tap weight; successive taps are at 0.5 UI. In this example the FFE 302 has 9 taps. In FIGS. 10*b* and 10*c* the encoded data 102 is return-to-zero RZ (PAM-2 with RZ shaping) data but the approach may also be used with e.g. RZ PAM-4 encoded data: the output optical waveform would then be NRZ or PAM-4 respectively.

In general, any of the implementations described herein may include a linear equalizer between the laser driver and laser to compensate for distortion of the current drive waveform caused by the electrical channel between the laser drive and laser, parasitic electrical characteristics of the laser and associated packaging, and the like.

Features of the method and system which have been described or depicted herein in combination e.g. in an embodiment, may be implemented separately or in subcombinations. Features from different embodiments may be combined. Thus, each feature disclosed or illustrated in the present specification may be incorporated in the invention, whether alone or in any appropriate combination with any other feature disclosed or illustrated herein. Method steps should not be taken as requiring a particular order e.g. that in which they are described or depicted, unless this is specifically stated. A system may be configured to perform a task by providing hardware e.g. electronic circuitry to implement the task.

The various pulse shapes mentioned e.g.: Gaussian convolved with NRZ, Raised Cosine and RZ convolved with an FFE having T/2 spacing between tap are illustrative only and the described techniques are not limited to these particular pulse shapes or spacing between taps. Other pulse shapes, spacing between taps, of analog or digital FFE's, or spacing between samples of signals or approximate back-calculated currents may be used. For example simulations have shown that the target drive current waveform for the laser can also be generated using a spacing of T between taps, and adequately with different spacings e.g. 0.75T. In addition, PAM-M is an illustrative modulation scheme and the technique is not limited to PAM-M. For example, with modifications, the method may be used with Partial Response (PR), Carrier-less Amplitude/Phase (CAP) and Quadrature Amplitude/Phase (QAM) modulation schemes.

With suitable modifications, the method may be applied to other optical modulators or optical sources having optical output waveforms described by ordinary differential equations similar to those governing lasers.

Aspects of the method and driver system have been described in terms of embodiments, but these embodiments are illustrative only and the claims are not limited to those embodiments. Those skilled in the art will be able to make modifications and identify alternatives in view of the disclosure which are contemplated as falling within the scope of the claims.

The invention claimed is:

1. A method of driving a directly modulated laser whilst correcting non-linearities in an optical output waveform of the laser, comprising:

obtaining encoded data defining a target output waveform of the laser for transmission of the encoded data, wherein the target output waveform represents a target optical output of the laser over time;

determining a target drive current waveform for the laser to reproduce the target output waveform; and driving the laser using the target drive current waveform;

wherein the target drive current waveform comprises a constant drive current term ($I_D$) and a second drive current term ($I_C$) having a value proportional to the target optical output, a first estimated drive current correction term ($\widetilde{i_B}$) having a value dependent upon a first derivative rate of change of the target optical output with time, and a second estimated drive current correction term ($\widetilde{i_A}$) having a value dependent upon a second derivative rate of change of the target optical output with time;

wherein the first estimated drive current correction term is proportional to the first derivative rate of change of the target optical output with time with a first proportionality factor approximated as $$\tau_p + \frac{\varepsilon}{g_0}$$

wherein $\tau_p$ is a photon lifetime, $\varepsilon$ is a gain compression factor, and $g_0$ is a gain slope constant, and wherein the second estimated drive current correction term is proportional to the second derivative rate of change of the target optical output with time, with a proportionality factor approximated as the first proportionality factor times $$\left(\frac{1}{\overline{N_p}} + \varepsilon\right) \frac{g_0 \tau_p \tau_\varepsilon}{(\varepsilon + g_0 \tau_\varepsilon)(\varepsilon + g_0 \tau_p)}$$

wherein $\overline{N_p}$ is the average photon density, and $\tau_\varepsilon$ is an electron lifetime.

2. The method of claim 1 wherein the first estimated drive current correction term, $\widetilde{i_B}$, has a value proportional to the first derivative rate of change of the target optical output with time, and the second estimated drive current correction term, $\widetilde{i_A}$, has a value proportional to the second derivative rate of change of the target optical output with time.

3. The method of claim 1 wherein the target drive current waveform is defined by $$a\frac{d\widetilde{i_B}(t)}{dt} + b\frac{d\widetilde{i_C}(t)}{dt} + I_C(t) + I_D, \text{ where } \widetilde{i_B}(t) = \frac{d\widetilde{i_C}(t)}{dt}$$

and where a and b are constants.

4. The method of claim 1, wherein a and b are determined from parameters of the laser and from an operating bias point of the laser.

5. The method of claim 1, further comprising:

modifying the second estimated drive current correction term ($\widetilde{i_A}$, $I_A^{st}$) for a positive transition in which the optical output increases, to advance a timing of the second estimated drive current correction term with respect to the positive transition; and/or modifying the second estimated drive current correction term ($\widetilde{i_A}$, $I_A^{st}$) for a negative transition in which the optical output decreases, to delay a timing of the second estimated drive current correction term with respect to the negative transition.

6. The method of claim 5 wherein the modifying comprises determining a timing-adjusted version of a waveform of the encoded data and determining a modified second estimated drive current correction term ($I_A^{st}$) from the timing-adjusted version of the waveform.

7. The method of claim 5 wherein determines a modified second estimated drive current correction term ($I_A^{st}$), further comprising scaling one or both of the first estimated drive current correction term and the second estimated drive current correction term dependent on a timing misalignment between the modified second drive current term ($I_A^{st}$) and the second estimated drive current correction term.

8. The method of claim 1 wherein the encoded data is PAM-M modulated and a waveform of the encoded data has step transitions between discrete PAM-M levels of the optical output of the laser, and wherein the first estimated drive current correction term and the second estimated drive current correction term are each scaled by a size of the step transitions between the discrete PAM-M levels.

9. The method of claim 1 wherein determining the target drive current waveform for the laser, comprises:

determining the second drive current term ($I_C$) from a waveform of the encoded data;

differentiating and scaling the second drive current term to determine the first estimated drive current correction term and the second estimated drive current correction term; and summing the second drive current term, the first estimated drive current correction term, and the second estimated drive current correction term.

10. The method of claim 1 wherein a waveform of the encoded data has step transitions between discrete levels of optical output of the laser, and wherein determining the target drive current waveform for the laser, comprises:

determining the second drive current term ($I_C$) from the waveform of the encoded data;

determining the first estimated drive current correction term from a first di-code representation of transitions of the waveform of the encoded data;

determining the second estimated drive current correction term from a second di-code, bi-phase representation of transitions of the waveform of the encoded data; and combining the second drive current term, the first estimated drive current correction term, and the second estimated drive current correction term.

11. The method of claim 10 when dependent upon claim 6, wherein the second di-code, bi-phase representation is time-aligned with transitions of the timing-adjusted version of the waveform of the encoded data.

12. The method of claim 10 wherein determining the target drive current waveform for the laser is performed using a serializer-deserializer (SerDes) circuit.

13. The method of claim 1 wherein the waveform of the encoded data defines symbols of a data modulation scheme, and wherein determining the target drive current waveform for the laser comprises passing the waveform of the encoded data through a feed forward equalizer with taps having a spacing of half a symbol period of the encoded data.

14. The method of claim 1 further comprising:

obtaining feedback data characterizing an optical waveform of the laser, and modifying the target drive current waveform responsive to the feedback data to optimise the optical waveform of the laser, wherein modifying the target drive current waveform comprises modifying one or both of the first estimated drive current correction term and the second estimated drive current correction term.

15. A driver for a laser of an optical data communications system, comprising:

an input to receive encoded data defining a target output waveform of the laser, wherein the target output waveform defines a target optical output of the laser over time;

an output to provide a current drive for the laser; and a system configured to determine a target drive current waveform for the current drive to reproduce the target output waveform; wherein the target drive current waveform comprises a constant drive current term (ID) and a second drive current term ($I_C$) having a value proportional to the target optical output, a first estimated drive current correction term ($\widetilde{I_B}$) having a value dependent upon a first derivative rate of change of the target optical output with time, and a second estimated drive current correction term ($\widetilde{I_A}$) having a value dependent upon a second derivative rate of change of the target optical output with time;

wherein the first estimated drive current correction term is proportional to the first derivative rate of change of the target optical output with time with a first proportionality factor approximated as $$\tau_p + \frac{\varepsilon}{g_0}$$

wherein $\tau_p$ is a photon lifetime, $\varepsilon$ is a gain compression factor, and $g_0$ is a gain slope constant, and wherein the second estimated drive current correction term is proportional to the second derivative rate of change of the target optical output with time, with a proportionality factor approximated as the first proportionality factor times $$\left(\frac{1}{N_p} + \varepsilon\right)\frac{g_0\tau_p\tau_\varepsilon}{(\varepsilon + g_0\tau_\varepsilon)(\varepsilon + g_0\tau_p)}$$

wherein $\overline{N_p}$ is the average photon density, and $\tau_\varepsilon$ is an electron lifetime.

16. The driver of claim 15 wherein the target drive current waveform is defined by $$a\frac{d\widetilde{I_R}(t)}{dt} + b\frac{d\widetilde{I_C}(t)}{dt} + I_C(t) + I_D, \text{ where } \widetilde{I_R}(t) = \frac{d\widetilde{I_C}(t)}{dt}$$

and where a and b are constants.

17. The driver of claim 15 wherein a waveform of the encoded data has transitions between at least two discrete levels of optical output of the laser, and wherein the system is configured to modify the second estimated drive current correction term ($\widetilde{I_A}$) to advance a timing of portions of the second estimated drive current correction term corresponding to transitions of the waveform of the encoded data to a higher level of optical output, and to delay a timing of portions of the second estimated drive current correction term corresponding to transitions of the waveform of the encoded data to a lower level of optical output.

18. The driver of claim 15 further comprising:

an input to receive feedback data characterizing an optical waveform of the laser, and a sub-system configured to modify the target drive current waveform responsive to the feedback data to optimise the optical waveform of the laser, wherein modifying the target drive current waveform comprises modifying one or both of the first estimated drive current correction term and the second estimated drive current correction term.

* * * * *